US012580867B2

(12) United States Patent
Khoshnevisan et al.

(10) Patent No.: US 12,580,867 B2
(45) Date of Patent: Mar. 17, 2026

(54) RULES FOR DROPPING OVERLAPPING UPLINK SHARED CHANNEL MESSAGES

(71) Applicant: QUALCOMM Incorporated, San Diego, CA (US)

(72) Inventors: Mostafa Khoshnevisan, San Diego, CA (US); Xiaoxia Zhang, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 608 days.

(21) Appl. No.: 17/945,799

(22) Filed: Sep. 15, 2022

(65) Prior Publication Data

US 2024/0098029 A1 Mar. 21, 2024

(51) Int. Cl.
*H04L 47/24* (2022.01)
*H04W 28/02* (2009.01)

(52) U.S. Cl.
CPC ....... *H04L 47/245* (2013.01); *H04W 28/0284* (2013.01)

(58) Field of Classification Search
CPC .......................... H04L 47/245; H04W 28/0284
See application file for complete search history.

(56) References Cited

U.S. PATENT DOCUMENTS

| | | | | |
|---|---|---|---|---|
| 9,497,006 | B2 * | 11/2016 | Chung | ................... H04L 5/0053 |
| 10,980,034 | B2 * | 4/2021 | Yang | .................... H04B 7/0626 |
| 2022/0191839 | A1 * | 6/2022 | Ying | ..................... H04W 72/23 |
| 2023/0024055 | A1 * | 1/2023 | Lu | ..................... H04W 72/1268 |
| 2023/0048026 | A1 * | 2/2023 | Huang | .................. H04W 72/23 |
| 2023/0189273 | A1 * | 6/2023 | Fu | .......................... H04L 5/0064 |
| | | | | 370/329 |
| 2024/0298320 | A1 * | 9/2024 | Wong | .................. H04W 72/566 |
| 2025/0048360 | A1 * | 2/2025 | Deghel | ................. H04L 5/0035 |

* cited by examiner

*Primary Examiner* — Rasheed Gidado
(74) *Attorney, Agent, or Firm* — QUALCOMM Incorporated

(57) ABSTRACT

Methods, systems, and devices for wireless communications are described. A user equipment (UE) may receive one or more control messages from a network entity scheduling a first and second physical uplink shared channel (PUSCH) messages that overlap at least partially in the time domain. For example, the UE may receive a first control message indicating a set of first PUSCH messages associated with a first rank value and a first quantity of ports and a second control message indicating a second PUSCH message associated with a second rank value and a second quantity of ports. In cases that transmitting both the first and second PUSCH messages exceeds a threshold rank value or a threshold quantity of ports, the UE may refrain from transmitting one of the first or second PUSCH messages.

22 Claims, 17 Drawing Sheets

1225

1230

1220

1200

130

105

115

Network
Entity

Transceiver

1310

Antenna

1315

Communications
Manager

1320

Memory

Code

1330

1325

1340

Processor

1335

1305

1300

Figure 14:
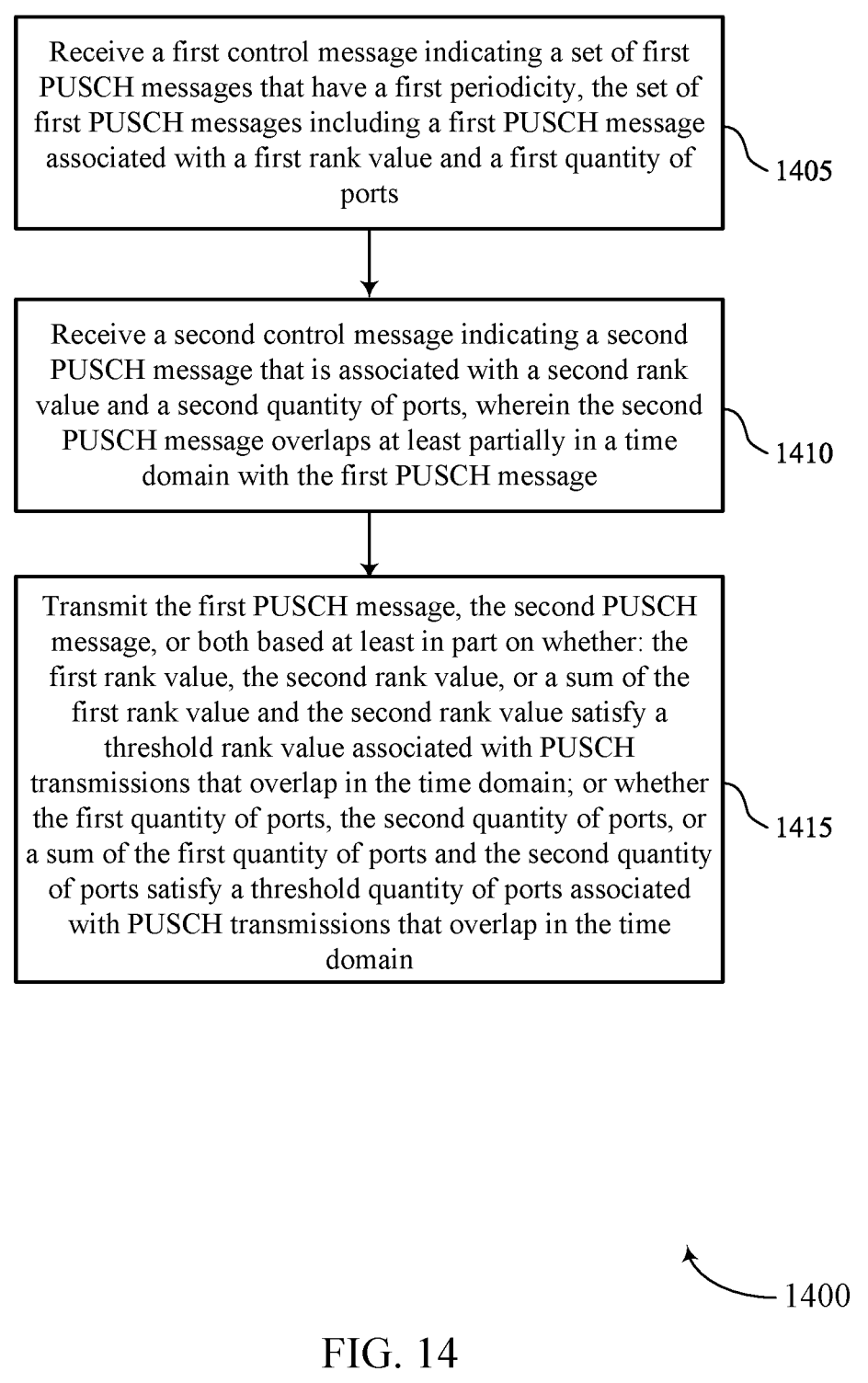

Receive a first control message indicating a set of first PUSCH messages that have a first periodicity, the set of first PUSCH messages including a first PUSCH message associated with a first rank value and a first quantity of ports

1405

Receive a second control message indicating a second PUSCH message that is associated with a second rank value and a second quantity of ports, wherein the second PUSCH message overlaps at least partially in a time domain with the first PUSCH message

1410

Transmit the first PUSCH message, the second PUSCH message, or both based at least in part on whether: the first rank value, the second rank value, or a sum of the first rank value and the second rank value satisfy a threshold rank value associated with PUSCH transmissions that overlap in the time domain; or whether the first quantity of ports, the second quantity of ports, or a sum of the first quantity of ports and the second quantity of ports satisfy a threshold quantity of ports associated with PUSCH transmissions that overlap in the time domain

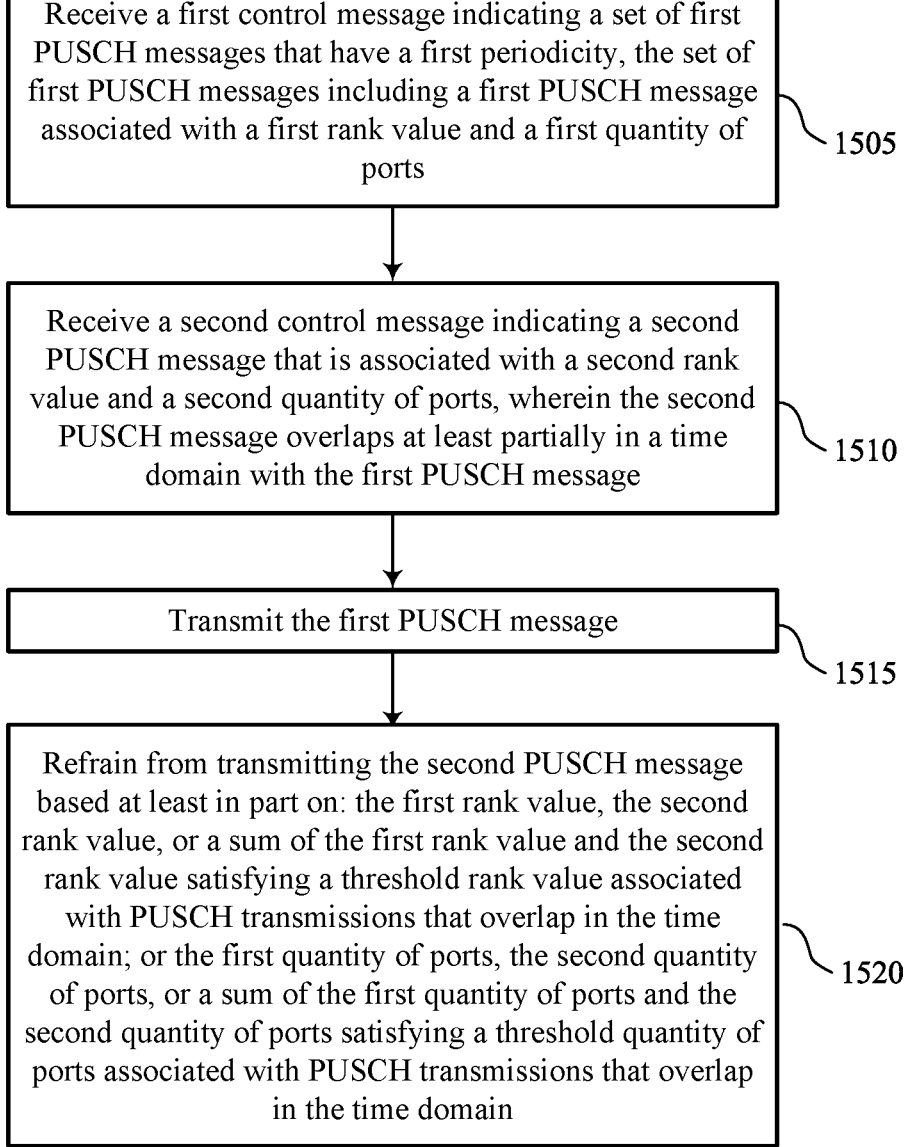

Receive a first control message indicating a set of first PUSCH messages that have a first periodicity, the set of first PUSCH messages including a first PUSCH message associated with a first rank value and a first quantity of ports

1505

Receive a second control message indicating a second PUSCH message that is associated with a second rank value and a second quantity of ports, wherein the second PUSCH message overlaps at least partially in a time domain with the first PUSCH message

1510

Transmit the first PUSCH message

1515

Refrain from transmitting the second PUSCH message based at least in part on: the first rank value, the second rank value, or a sum of the first rank value and the second rank value satisfying a threshold rank value associated with PUSCH transmissions that overlap in the time domain; or the first quantity of ports, the second quantity of ports, or a sum of the first quantity of ports and the second quantity of ports satisfying a threshold quantity of ports associated with PUSCH transmissions that overlap in the time domain

Figure 16:
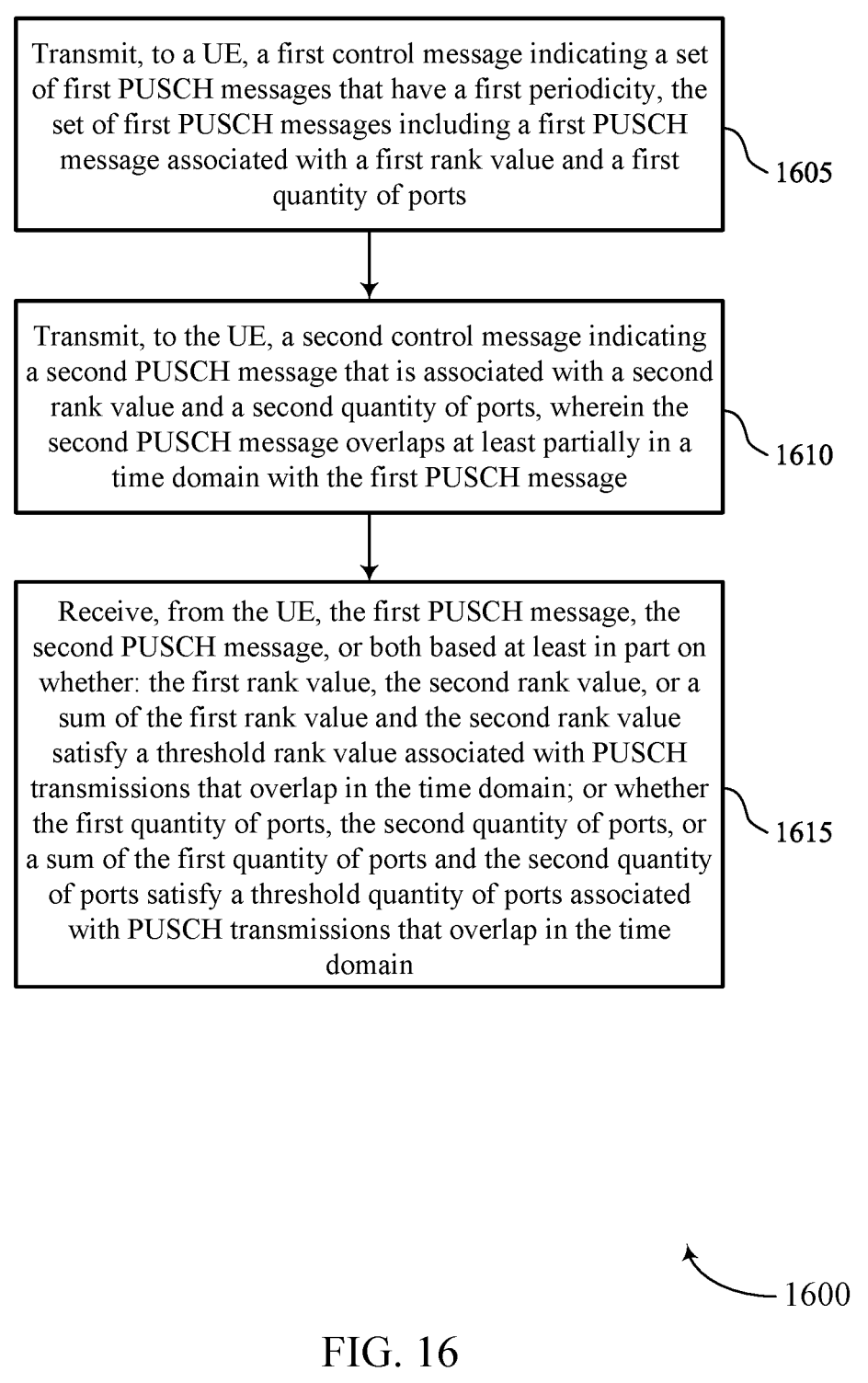

Transmit, to a UE, a first control message indicating a set of first PUSCH messages that have a first periodicity, the set of first PUSCH messages including a first PUSCH message associated with a first rank value and a first quantity of ports

1605

Transmit, to the UE, a second control message indicating a second PUSCH message that is associated with a second rank value and a second quantity of ports, wherein the second PUSCH message overlaps at least partially in a time domain with the first PUSCH message

1610

Receive, from the UE, the first PUSCH message, the second PUSCH message, or both based at least in part on whether: the first rank value, the second rank value, or a sum of the first rank value and the second rank value satisfy a threshold rank value associated with PUSCH transmissions that overlap in the time domain; or whether the first quantity of ports, the second quantity of ports, or a sum of the first quantity of ports and the second quantity of ports satisfy a threshold quantity of ports associated with PUSCH transmissions that overlap in the time domain

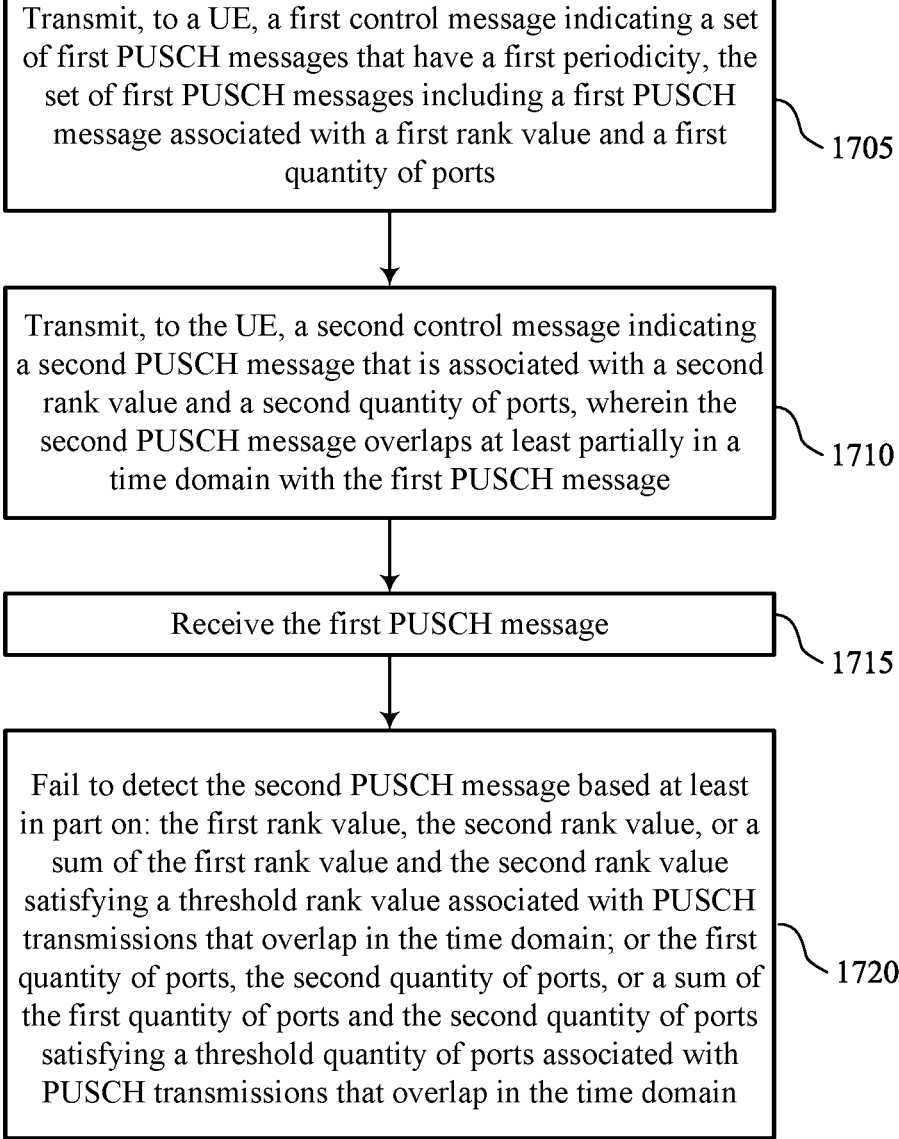

Transmit, to a UE, a first control message indicating a set of first PUSCH messages that have a first periodicity, the set of first PUSCH messages including a first PUSCH message associated with a first rank value and a first quantity of ports

1705

Transmit, to the UE, a second control message indicating a second PUSCH message that is associated with a second rank value and a second quantity of ports, wherein the second PUSCH message overlaps at least partially in a time domain with the first PUSCH message

1710

Receive the first PUSCH message

1715

Fail to detect the second PUSCH message based at least in part on: the first rank value, the second rank value, or a sum of the first rank value and the second rank value satisfying a threshold rank value associated with PUSCH transmissions that overlap in the time domain; or the first quantity of ports, the second quantity of ports, or a sum of the first quantity of ports and the second quantity of ports satisfying a threshold quantity of ports associated with PUSCH transmissions that overlap in the time domain

RULES FOR DROPPING OVERLAPPING UPLINK SHARED CHANNEL MESSAGES

FIELD OF TECHNOLOGY

The following relates to wireless communications, including rules for dropping overlapping uplink shared channel messages.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support rules for dropping overlapping uplink shared channel messages. Generally, the described techniques provide for a user equipment (UE) to transmit multiple uplink shared channel (PUSCH) transmissions that overlap at least partially in a time domain using a set of rules. In particular, the UE may receive, from a network entity, a first control message indicating a first set of PUSCH messages (e.g., a first set of periodic PUSCH messages scheduled via a configured grant (CG)) associated with a first rank value and a first quantity of ports. Additionally, the UE may receive, from the network entity, a second control message indicating a second PUSCH message (e.g., within a second set of periodic PUSCH messages scheduled via a CG, a single PUSCH message scheduled via a dynamic grant (DG)) associated with a second rank value and a second quantity of ports. In some cases, the UE may be configured with a threshold rank value associated with PUSCH transmissions that overlap in the time domain, a threshold quantity of ports associated with PUSCH transmissions that overlap in the time domain, or both. If the multiple PUSCH messages that are scheduled to overlap in the time domain are associated with rank values or quantities of ports that exceed the threshold rank values or the threshold quantities of ports, respectively, the UE may implement the rules (e.g., the dropping rules) to determine whether to refrain from transmitting (e.g., to drop) the first or second PUSCH messages.

In some cases, the rules may indicate for the UE to refrain from transmitting a PUSCH message based on a control resource set (CORESET) index or a sounding reference signal (SRS) resource set associated with the PUSCH messages, a priority of the PUSCH messages, a starting time of the PUSCH messages, a CG configuration index associated with the PUSCH messages, a periodicity of the PUSCH messages, a modulation and coding scheme (MCS) associated with the PUSCH messages, a transport block size of the PUSCH messages, a quantity of layers associated with the PUSCH messages, or based on one of the overlapping PUSCH messages being a DG-PUSCH message and the other of the overlapping PUSCH messages being a CG-PUSCH message. Additionally, or alternatively, the rules may indicate for the UE to drop a PUSCH message based on which of the PUSCH messages is associated with a quantity of ports or rank value causing the simultaneous transmission of the PUSCH messages to exceed the threshold rank values or the threshold quantities of ports.

A method for wireless communications is described. The method may include receiving a first control message indicating a set of first PUSCH messages that have a first periodicity, the set of first PUSCH messages including a first PUSCH message associated with a first rank value and a first quantity of ports, receiving a second control message indicating a second PUSCH message that is associated with a second rank value and a second quantity of ports, where the second PUSCH message overlaps at least partially in a time domain with the first PUSCH message, and transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

An apparatus for wireless communications is described. The apparatus may include a processor, memory coupled with the processor, and instructions stored in the memory. The instructions may be executable by the processor to cause the apparatus to receive a first control message indicating a set of first PUSCH messages that have a first periodicity, the set of first PUSCH messages including a first PUSCH message associated with a first rank value and a first quantity of ports, receive a second control message indicating a second PUSCH message that is associated with a second rank value and a second quantity of ports, where the second PUSCH message overlaps at least partially in a time domain with the first PUSCH message, and transmit the first PUSCH message, the second PUSCH message, or both based on whether: the first rank value, the second rank value, or a sum of the first rank value and the second rank value satisfy a threshold rank value associated with PUSCH transmissions that overlap in the time domain; or the first quantity of ports, the second quantity of ports, or a sum of the first quantity of ports and the second quantity of ports satisfy a threshold quantity of ports associated with PUSCH transmissions that overlap in the time domain.

Another apparatus for wireless communications is described. The apparatus may include means for receiving a first control message indicating a set of first PUSCH messages that have a first periodicity, the set of first PUSCH messages including a first PUSCH message associated with a first rank value and a first quantity of ports, means for receiving a second control message indicating a second PUSCH message that is associated with a second rank value and a second quantity of ports, where the second PUSCH message overlaps at least partially in a time domain with the first PUSCH message, and means for transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

A non-transitory computer-readable medium storing code for wireless communications is described. The code may include instructions executable by a processor to receive a first control message indicating a set of first PUSCH messages that have a first periodicity, the set of first PUSCH messages including a first PUSCH message associated with a first rank value and a first quantity of ports, receive a second control message indicating a second PUSCH message that is associated with a second rank value and a second quantity of ports, where the second PUSCH message overlaps at least partially in a time domain with the first PUSCH message, and transmit the first PUSCH message, the second PUSCH message, or both based on whether: the first rank value, the second rank value, or a sum of the first rank value and the second rank value satisfy a threshold rank value associated with PUSCH transmissions that overlap in the time domain; or the first quantity of ports, the second quantity of ports, or a sum of the first quantity of ports and the second quantity of ports satisfy a threshold quantity of ports associated with PUSCH transmissions that overlap in the time domain.

In some examples of the method, apparatuses, and non-transitory computer-readable medium described herein, transmitting the first PUSCH message, the second PUSCH message, or both may include operations, features, means, or instructions for transmitting the first PUSCH message and refraining from transmitting the second PUSCH message based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples of the method, apparatuses, and non-transitory computer-readable medium described herein, transmitting the first PUSCH message and refraining from transmitting the second PUSCH message is based on a CORESET index associated with the second PUSCH message, an SRS resource set associated with the second PUSCH message, or both; and the UE refrains from transmitting PUSCH messages associated with the CORESET index or the SRS resource set when: one or more control messages indicate PUSCH messages that overlap in the time domain, and one or more rank values associated with the PUSCH messages that overlap in the time domain satisfy the threshold rank value or one or more quantities of ports associated with the PUSCH messages that overlap in the time domain satisfy the threshold quantity of ports.

Some examples of the method, apparatuses, and non-transitory computer-readable medium described herein, transmitting the first PUSCH message and refraining from transmitting the second PUSCH message may be based on a first priority associated with the first PUSCH message being greater than a second priority associated with the second PUSCH message.

Some examples of the method, apparatuses, and non-transitory computer-readable medium described herein, transmitting the first PUSCH message and refraining from transmitting the second PUSCH message may be based on a first starting position of the first PUSCH message being prior to a second starting position of the second PUSCH message.

In some examples of the method, apparatuses, and non-transitory computer-readable medium described herein, the second control message indicates a set of second PUSCH messages including the second PUSCH message, the set of second PUSCH messages having a second periodicity and transmitting the first PUSCH message and refraining from transmitting the second PUSCH message may be based on the UE refraining from transmitting the second PUSCH message from the set of second PUSCH messages when: the second PUSCH message overlaps in the time domain with another PUSCH message, and one or more rank values associated with PUSCH messages that overlap in the time domain satisfies the threshold rank value or one or more quantities of ports associated with the PUSCH messages that overlap in the time domain satisfies the threshold quantity of ports.

In some examples of the method, apparatuses, and non-transitory computer-readable medium described herein, the UE refrains from transmitting the second PUSCH message from the set of second PUSCH messages based on a second CG configuration index associated with the set of second PUSCH messages being greater than a first CG configuration index associated with the set of first PUSCH messages or the second CG configuration index being less than the first CG configuration index.

In some examples of the method, apparatuses, and non-transitory computer-readable medium described herein, the UE refrains from transmitting PUSCH messages from the set of second PUSCH messages based on the second periodicity of the set of second PUSCH messages being greater than the first periodicity of the set of first PUSCH messages or the second periodicity of the set of second PUSCH messages being less than the first periodicity of the set of first PUSCH messages.

In some examples of the method, apparatuses, and non-transitory computer-readable medium described herein, transmitting the first PUSCH message and refraining from transmitting the second PUSCH message is based on: a first comparison between a first MCS associated with the first PUSCH message and a second MCS associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

In some examples of the method, apparatuses, and non-transitory computer-readable medium described herein, the threshold quantity of ports associated with PUSCH transmissions that overlap in the time domain include a first threshold quantity of ports associated with the set of first PUSCH messages and a second threshold quantity of ports associated with the second PUSCH message, and transmitting the first PUSCH message and refraining from transmitting the second PUSCH message may be based on: the first quantity of ports associated with the set of first PUSCH messages being less than or equal to the first threshold quantity of ports, and the second quantity of ports associated with the second PUSCH message being greater than the second threshold quantity of ports.

In some examples of the method, apparatuses, and non-transitory computer-readable medium described herein, the first control message indicates that the set of first PUSCH messages may be CG-PUSCH messages, receiving the second control message may include operations, features, means, or instructions for receiving downlink control information (DCI) indicating that the second PUSCH message may be a DG-PUSCH message, and transmitting the first PUSCH message, the second PUSCH message, or both may include operations, features, means, or instructions for refraining from transmitting the first PUSCH message and transmitting the second PUSCH message based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

Some examples of the method, apparatuses, and non-transitory computer-readable medium described herein, refraining from transmitting the first PUSCH message and transmitting the second PUSCH message may be based on the first PUSCH message being a CG-PUSCH message and the second PUSCH message being the DG-PUSCH message.

In some examples of the method, apparatuses, and non-transitory computer-readable medium described herein, the first control message indicates a first set of multiple PUSCH messages including at least the first PUSCH message that overlap at least partially in the time domain, and the second control message indicates a second set of multiple PUSCH messages including at least the second PUSCH message that overlap at least partially in the time domain.

Some examples of the method, apparatuses, and non-transitory computer-readable medium described herein may further include operations, features, means, or instructions for selecting the first PUSCH message from the first set of multiple PUSCH messages and the second PUSCH message from the second set of multiple PUSCH messages based on: the first PUSCH message being associated with a higher priority than remaining PUSCH messages in the first set of multiple PUSCH messages; the second PUSCH message being associated with a higher priority than remaining PUSCH messages in the second set of multiple PUSCH messages, the first rank value; the second rank value; or the sum of the first rank value and the second rank value being less than or equal to the threshold rank value; the first quantity of ports, the second quantity of ports, or the sum of the first quantity of ports and the second quantity of ports being less than or equal to the threshold quantity of ports; or a combination thereof, where transmitting the first PUSCH message, the second PUSCH message, or both may be based on selecting the first PUSCH message and the second PUSCH message.

In some examples of the method, apparatuses, and non-transitory computer-readable medium described herein, the threshold rank value associated with PUSCH transmissions that overlap in the time domain corresponds to an aggregate threshold rank value the UE may be capable of supporting for PUSCH transmissions that overlap in the time domain; and transmitting the first PUSCH message, the second PUSCH message, or both may be based on whether the sum of the first rank value and the second rank value satisfies the threshold rank value.

In some examples of the method, apparatuses, and non-transitory computer-readable medium described herein, the threshold rank value associated with PUSCH transmissions that overlap in the time domain includes a first threshold rank value associated with the set of first PUSCH messages and a second threshold rank value associated with the second PUSCH message; and transmitting the first PUSCH message, the second PUSCH message, or both may be based on whether the first rank value satisfies the first threshold rank value or the second rank value satisfies the second threshold rank value.

In some examples of the method, apparatuses, and non-transitory computer-readable medium described herein, the threshold quantity of ports associated with PUSCH transmissions that overlap in the time domain corresponds to an aggregate threshold quantity of ports the UE may be capable of supporting for PUSCH transmissions that overlap in the time domain; and transmitting the first PUSCH message, the second PUSCH message, or both may be based on whether the sum of the first quantity of ports and the second quantity of ports satisfies the threshold quantity of ports.

In some examples of the method, apparatuses, and non-transitory computer-readable medium described herein, the threshold quantity of ports associated with PUSCH transmissions that overlap in the time domain corresponds to a first threshold quantity of ports associated with the set of first PUSCH messages and a second threshold quantity of ports associated with the second PUSCH message; and transmitting the first PUSCH message, the second PUSCH message, or both may be based on whether the first quantity of ports satisfies the first threshold quantity of ports or the second quantity of ports satisfies the second threshold quantity of ports.

In some examples of the method, apparatuses, and non-transitory computer-readable medium described herein, transmitting the first PUSCH message, the second PUSCH message, or both may include operations, features, means, or instructions for transmitting the first PUSCH message and the second PUSCH message based on: the first rank value, the second rank value, or the sum of the first rank value and the second rank value being less than or equal to the threshold rank value; and the first quantity of ports, the second quantity of ports, or the sum of the first quantity of ports and the second quantity of ports being less than or equal to the threshold quantity of ports.

A method for wireless communications at a network entity is described. The method may include transmitting, to a UE, a first control message indicating a set of first PUSCH messages that have a first periodicity, the set of first PUSCH messages including a first PUSCH message associated with a first rank value and a first quantity of ports, transmitting, to the UE, a second control message indicating a second PUSCH message that is associated with a second rank value and a second quantity of ports, where the second PUSCH message overlaps at least partially in a time domain with the first PUSCH message, and receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

An apparatus for wireless communications at a network entity is described. The apparatus may include a processor, memory coupled with the processor, and instructions stored in the memory. The instructions may be executable by the processor to cause the apparatus to transmit, to a UE, a first control message indicating a set of first PUSCH messages that have a first periodicity, the set of first PUSCH messages including a first PUSCH message associated with a first rank value and a first quantity of ports, transmit, to the UE, a second control message indicating a second PUSCH message that is associated with a second rank value and a second quantity of ports, where the second PUSCH message overlaps at least partially in a time domain with the first PUSCH message, and receive, from the UE, the first PUSCH message, the second PUSCH message, or both based on whether: the first rank value, the second rank value, or a sum of the first rank value and the second rank value satisfy a threshold rank value associated with PUSCH transmissions that overlap in the time domain; or the first quantity of ports, the second quantity of ports, or a sum of the first quantity of ports and the second quantity of ports satisfy a threshold quantity of ports associated with PUSCH transmissions that overlap in the time domain.

Another apparatus for wireless communications at a network entity is described. The apparatus may include means for transmitting, to a UE, a first control message indicating a set of first PUSCH messages that have a first periodicity, the set of first PUSCH messages including a first PUSCH message associated with a first rank value and a first quantity of ports, means for transmitting, to the UE, a second control message indicating a second PUSCH message that is associated with a second rank value and a second quantity of ports, where the second PUSCH message overlaps at least partially in a time domain with the first PUSCH message, and means for receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

A non-transitory computer-readable medium storing code for wireless communications at a network entity is described. The code may include instructions executable by a processor to transmit, to a UE, a first control message indicating a set of first PUSCH messages that have a first periodicity, the set of first PUSCH messages including a first PUSCH message associated with a first rank value and a first quantity of ports, transmit, to the UE, a second control message indicating a second PUSCH message that is associated with a second rank value and a second quantity of ports, where the second PUSCH message overlaps at least partially in a time domain with the first PUSCH message, and receive, from the UE, the first PUSCH message, the second PUSCH message, or both based on whether: the first rank value, the second rank value, or a sum of the first rank value and the second rank value satisfy a threshold rank value associated with PUSCH transmissions that overlap in the time domain; or the first quantity of ports, the second quantity of ports, or a sum of the first quantity of ports and the second quantity of ports satisfy a threshold quantity of ports associated with PUSCH transmissions that overlap in the time domain.

In some examples of the method, apparatuses, and non-transitory computer-readable medium described herein, the network entity receiving the first PUSCH message, the second PUSCH message, or both may include operations, features, means, or instructions for receiving the first PUSCH message, and failing to detect the second PUSCH message based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples of the method, apparatuses, and non-transitory computer-readable medium described herein, the network entity receives the first PUSCH and fails to detect the second PUSCH based on a CORESET index associated with the second PUSCH message, an SRS resource set associated with the second PUSCH message, or both.

In some examples of the method, apparatuses, and non-transitory computer-readable medium described herein, the network entity receives the first PUSCH and fails to detect the second PUSCH based on a first priority associated with the first PUSCH message satisfying a second priority associated with the second PUSCH message.

In some examples of the method, apparatuses, and non-transitory computer-readable medium described herein, the network entity receives the first PUSCH and fails to detect the second PUSCH based on a first starting position of the first PUSCH message being prior to a second starting position of the second PUSCH message.

In some examples of the method, apparatuses, and non-transitory computer-readable medium described herein, the second control message indicates a set of second PUSCH messages including the second PUSCH message, the set of second PUSCH messages having a second periodicity.

In some examples of the method, apparatuses, and non-transitory computer-readable medium described herein, the network entity receives the first PUSCH and fails to detect the second PUSCH based on a second CG configuration index associated with the set of second PUSCH messages being greater than a first CG configuration index associated with the set of first PUSCH messages or the second CG configuration index being less than the first CG configuration index.

In some examples of the method, apparatuses, and non-transitory computer-readable medium described herein, the network entity receives the first PUSCH and fails to detect the second PUSCH based on the second periodicity of the set of second PUSCH messages being greater than the first periodicity of the set of first PUSCH messages or the second periodicity of the set of second PUSCH messages being less than the first periodicity of the set of first PUSCH messages.

In some examples of the method, apparatuses, and non-transitory computer-readable medium described herein, the network entity receives the first PUSCH and fails to detect the second PUSCH based on a first comparison between a first MCS associated with the first PUSCH message being lower than and a second MCS associated with the second PUSCH message, a second comparison between a first transport block size associated with the first PUSCH message being smaller than and a second transport block size associated with the second PUSCH message, or a third comparison between the first rank value associated with the first PUSCH message being smaller than and the second rank value associated with the second PUSCH message.

In some examples of the method, apparatuses, and non-transitory computer-readable medium described herein, the threshold rank value associated with PUSCH transmissions that overlap in the time domain include a first threshold rank value associated with the set of first PUSCH messages and a second threshold rank value associated with the second PUSCH message, and the network entity receives the first PUSCH message and fails to detect the second PUSCH message based on the first rank value associated with the set of first PUSCH messages being less than or equal to the first threshold rank value, and the second rank value associated with the second PUSCH message being greater than the second threshold rank value.

In some examples of the method, apparatuses, and non-transitory computer-readable medium described herein, the threshold quantity of ports associated with PUSCH transmissions that overlap in the time domain include a first threshold quantity of ports associated with the set of first PUSCH messages and a second threshold quantity of ports associated with the second PUSCH message, and the network entity receives the first PUSCH message and fails to detect the second PUSCH message based on the first quantity of ports associated with the set of first PUSCH messages being less than or equal to the first threshold quantity of ports, and the second quantity of ports associated with the second PUSCH message being greater than the second threshold quantity of ports.

In some examples of the method, apparatuses, and non-transitory computer-readable medium described herein, the first control message indicates that the set of first PUSCH messages are configured grant PUSCH messages; transmitting the second control message may include operations, features, means, or instructions for transmitting DCI indicating that the second PUSCH message is a DG-PUSCH message; and receiving the first PUSCH message and failing to detect the second PUSCH message may be based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples of the method, apparatuses, and non-transitory computer-readable medium described herein, failing to detect the first PUSCH and receiving the second PUSCH may be based on the first PUSCH message being a CG-PUSCH message and the second PUSCH message being the DG-PUSCH message.

In some examples of the method, apparatuses, and non-transitory computer-readable medium described herein, the first control message indicates a first set of PUSCH messages including at least the first PUSCH message that overlap at least partially in the time domain, and the second control message indicates a second set of PUSCH messages including at least the second PUSCH message that overlap at least partially in the time domain.

In some examples of the method, apparatuses, and non-transitory computer-readable medium described herein may further include operations, features, means, or instructions for receiving the first PUSCH message from the first set of PUSCH messages and the second PUSCH message from the second set of PUSCH messages based on: the first PUSCH message being associated with a higher priority than remaining PUSCH messages in the first set of PUSCH messages, the second PUSCH message being associated with a higher priority than remaining PUSCH messages in the second set of PUSCH messages, the first rank value, the second rank value, or the sum of the first rank value and the second rank value being less than or equal to the threshold rank value, the first quantity of ports, the second quantity of ports, or the sum of the first quantity of ports and the second quantity of ports being less than or equal to the threshold quantity of ports, or a combination thereof, In some examples of the method, apparatuses, and non-transitory computer-readable medium described herein, the threshold rank value associated with PUSCH transmissions that overlap in the time domain corresponds to an aggregate threshold rank value the UE is capable of supporting for PUSCH transmissions that overlap in the time domain, and the network entity receives the first PUSCH message, the second PUSCH message, or both based on whether the sum of the first rank value and the second rank value satisfies the threshold rank value.

In some examples of the method, apparatuses, and non-transitory computer-readable medium described herein, the threshold rank value associated with PUSCH transmissions that overlap in the time domain includes a first threshold rank value associated with the set of first PUSCH messages and a second threshold rank value associated with the second PUSCH message, and the network entity receives the first PUSCH message, the second PUSCH message, or both based on whether the first rank value satisfies the first threshold rank value or the second rank value satisfies the second threshold rank value.

In some examples of the method, apparatuses, and non-transitory computer-readable medium described herein, the threshold quantity of ports associated with PUSCH transmissions that overlap in the time domain corresponds to an aggregate threshold quantity of ports the UE is capable of supporting for PUSCH transmissions that overlap in the time domain, and the network entity receives the first PUSCH message, the second PUSCH message, or both based on whether the sum of the first rank value and the second rank value satisfies the threshold rank value.

In some examples of the method, apparatuses, and non-transitory computer-readable medium described herein, the threshold quantity of ports associated with PUSCH transmissions that overlap in the time domain includes a first threshold quantity of ports associated with the set of first PUSCH messages and a second threshold quantity of ports associated with the second PUSCH message, and the network entity receives the first PUSCH message, the second PUSCH message, or both based on whether the first quantity of ports satisfies the first threshold quantity of ports or the second quantity of ports satisfies the second threshold quantity of ports.

In some examples of the method, apparatuses, and non-transitory computer-readable medium described herein, receiving the first PUSCH message, the second PUSCH message, or both may include operations, features, means, or instructions for receiving the first PUSCH message and the second PUSCH message based on: the first rank value, the second rank value, or the sum of the first rank value and the second rank value being less than or equal to the threshold rank value; and the first quantity of ports, the second quantity of ports, or the sum of the first quantity of ports and the second quantity of ports being less than or equal to the threshold quantity of ports.

BRIEF DESCRIPTION OF THE DRAWINGS

FIGS. 14 through 17 show flowcharts illustrating methods that support rules for dropping overlapping uplink shared channel messages in accordance with one or more aspects of the present disclosure.

DETAILED DESCRIPTION

Figure 1:
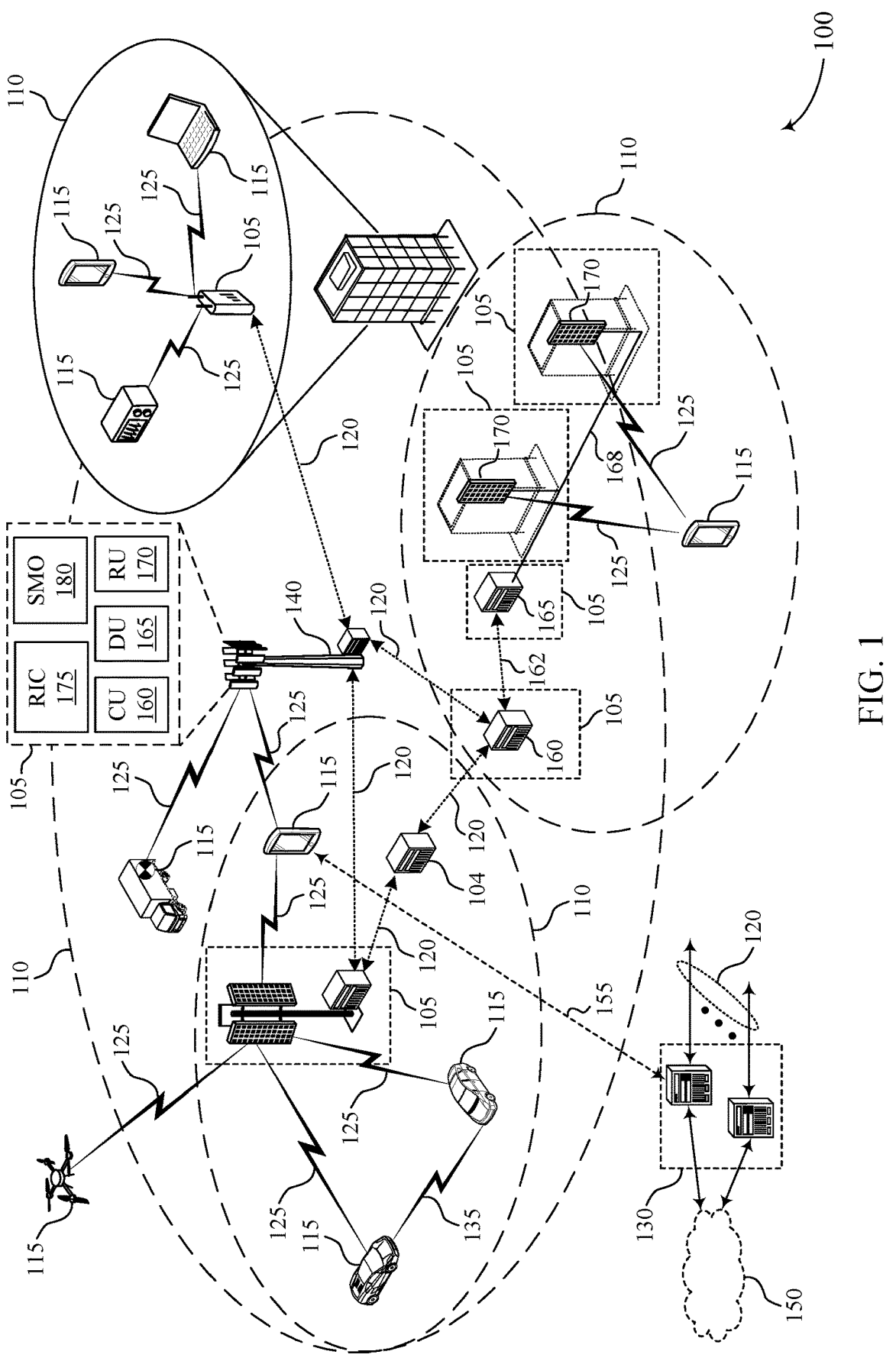
FIGS. 1 and 2 illustrate examples of wireless communications systems that support rules for dropping overlapping uplink shared channel messages in accordance with one or more aspects of the present disclosure.

In some wireless communications systems, a user equipment (UE) may be configured to transmit multiple uplink shared channel (PUSCH) transmissions that at least partially overlap in a time domain. In particular, the UE may receive, from a network entity, a first control message indicating a first set of PUSCH messages (e.g., a first set of periodic PUSCH messages scheduled via a configured grant (CG)) associated with a first rank value and a first quantity of ports (e.g., antenna ports). Additionally, the UE may receive, from the network entity, a second control message indicating a second PUSCH message (e.g., within a second set of periodic PUSCH messages scheduled via a CG, a single PUSCH message scheduled via a dynamic grant (DG)) associated with a second rank value and a second quantity of ports. In some cases, the UE may be configured with a threshold rank value associated with PUSCH transmissions that overlap in the time domain, a threshold quantity of ports associated with PUSCH transmissions that overlap in the time domain, or both. If the multiple PUSCH messages that are scheduled to overlap in the time domain are associated with rank values or quantities of ports that exceed the threshold rank values or the threshold quantities of ports, the UE may be unable to transmit the multiple PUSCH messages.

Techniques, systems, and devices described herein provide for a UE to implement a set of rules for dropping (e.g., for refraining from transmitting) one PUSCH message that is scheduled to overlap at least partially in time with another PUSCH message in cases that the UE is unable to transmit both PUSCH messages (e.g., due to the rank values or quantities of ports associated with both PUSCH messages exceeding the threshold rank values or the threshold quantities of ports associated with PUSCH transmissions that overlap in the time domain). The rules may include the UE dropping a PUSCH message based on the CORESET index or a sounding reference signal (SRS) resource set associated with the PUSCH messages, a priority of the PUSCH messages, a starting time of the PUSCH messages, a CG configuration index associated with the PUSCH messages, a periodicity of the PUSCH messages, a modulation and coding scheme (MCS) associated with the PUSCH messages, a transport block size of the PUSCH messages, a quantity of layers associated with the PUSCH messages, or based on one of the overlapping PUSCH messages being a DG-PUSCH message and the other of the overlapping PUSCH messages being a CG-PUSCH message. Additionally, or alternatively, the rules may indicate for the UE to drop a PUSCH message based on which of the PUSCH messages is associated with a quantity of ports or rank value causing the simultaneous transmission of the PUSCH messages to exceed the threshold rank values or the threshold quantities of ports.

Aspects of the disclosure are initially described in the context of wireless communications systems. Aspects of the disclosure are further illustrated by and described with reference to an uplink transmission scheme, an uplink transmission timeline, and a process flow. Aspects of the disclosure are further illustrated by and described with reference to apparatus diagrams, system diagrams, and flowcharts that relate to rules for dropping overlapping uplink shared channel messages.

FIG. 1 illustrates an example of a wireless communications system 100 that supports rules for dropping overlapping uplink shared channel messages in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support rules for dropping overlapping uplink shared channel messages as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more sub-bands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

In some examples, a network entity 105 may transmit signaling to a UE 115 scheduling one or more CG-PUSCH message transmissions. The CG-PUSCH message transmissions may be scheduled with an associated periodicity such that the UE 115 may transmit one or more of the scheduled PUSCH messages according to the periodicity. The wireless communications system 100 may support two types of uplink CGs at a UE 115: uplink CG Type 1 and uplink CG Type 2. Uplink CG Type 1 may be activated and deactivated via RRC signaling from a network entity 105. The network entity 105 may transmit transmission parameters included in the RRC signaling, such as parameters for the CG configuration (e.g., ConfiguredGrantConfig and rrc-ConfiguredUplinkGrant). Uplink CG Type 2 may be activated and deactivated via downlink control information (DCI) from the network entity 105. To activate the uplink CG, the network entity 105 may transmit an activation DCI, where the activation DCI may have a cyclic redundancy check (CRC) scrambled with a configured scheduling radio network temporary identifier (CS-RNTI). In this example, the CS-RNTI may correspond to a new data indicator (NDI) and a redundancy version (RV) (e.g., NDI=0 and RV=0) for validation. To deactivate the uplink CG, the network entity 105 may transmit a DCI release. In this example, transmission parameters may be transmitted by the network entity 105 via RRC and DCI (e.g., some parameters may be RRC configured (e.g., ConfiguredGrantConfig) and some parameters may be indicated by the activating DCI). In uplink CG Type 1 and uplink CG Type 2, the periodicity may be RRC configured. For example, the network entity 105 may transmit an uplink CG to the UE 115, and the UE 115 may transmit CG physical uplink shared channel (PUSCH) transmission according to the periodicity included in the RRC signaling.

In some examples, a network entity 105 may be associated with multiple TRPs. In some examples, the network entity 105 may transmit multiple DCI messages from each of the TRPs (e.g., multi-DCI based multi-TRP transmission). For example, the network entity 105 may transmit, from a first TRP to a UE 115, a first DCI scheduling a first PUSCH transmission (e.g., a CG-PUSCH transmission). Additionally, the network entity 105 may transmit, from a second TRP to the UE 115, a second DCI scheduling a second PUSCH transmission. The first DCI and the second DCI may include one or more parameters differentiating the first TRP and the second TRP as the transmission point of the network entity 105. For example, the parameters may include a CORESETPoolIndex, where each CORESET may be configured with a value of CORESETPoolIndex (e.g., 0 or 1). Here, CORESETs associated with a first value of the CORESETPoolIndex may be associated with the first TRP of the network entity 105 and CORESETs associated with a second value of the CORESETPoolIndex may be associated with the second TRP. Thus, each of the CORESETs (e.g., including five or fewer CORESETs) may be associated with a CORESETPoolIndex of 0 or 1, such that the CORESETs may be divided into two groups for each CORESETPoolIndex. In some examples, the UE 115 may be RRC configured (e.g., by the network entity 105) with a higher layer parameter to identify the CORESETPoolIndex (e.g., PDCCH-Config), which may include two different CORESETPoolIndex values in CORESETS for an active bandwidth of a serving cell of the network entity 105. Thus, the UE 115 may identify whether a DCI received via one or more resources within a CORSET is associated with the first TRP or the second TRP (e.g., based on the CORESETPoolIndex value associated with the CORESET).

In some examples, a UE 115 may be scheduled to transmit two PUSCH transmissions (e.g., two PUSCH messages) that are time domain modulated in a given component carrier or serving cell (e.g., across TRPs, CORESET indexes, or both), such that the PUSCH transmissions may be transmitted simultaneously. For example, two PUSCHs may be multiplexed and transmitted on a single PUSCH transmission based on a single DCI. For example, the UE 115 may be configured to transmit two PUSCH transmissions simultaneously if a first PUSCH transmission has one CORESETPoolIndex value and the second PUSCH transmission has another (e.g., different) CORESETPoolIndex value. In this example, the two CORESETPoolIndex values may correspond to two different TRPs at the network entity 105. The first CORESETPoolIndex value (e.g., 0) may be associated with a first SRS resource set. Here, the UE 115 may transmit the first PUSCH transmission using a first beam, a first transmission configuration indicator (TCI) state, a first set of power control parameters, and a first precoder. The second CORESETPoolIndex value (e.g., 1) may be associated with a second SRS resource set. Here, the UE 115 may transmit the second PUSCH transmission using a second beam, a second TCI state, a second set of power control parameters, and a second precoder.

Further, for both codebook-based and noncodebook-based PUSCH transmissions, a UE 115 may support, at a given time, one of various different configurations relating to how many layers (e.g., indicative of a rank value) the UE 115 may use for a simultaneous transmission with multiple panels (STxMP) deployment (e.g., in cases that the UE 115 is scheduled to transmit two PUSCH messages that overlap in the time domain). That is, the UE 115 may be configured (e.g., via RRC signaling) or may indicate (e.g., via a capability report) one or more threshold rank values associated with PUSCH transmissions that at least partially overlap in the time domain. In cases that the UE 115 is scheduled with two PUSCH transmissions associated with rank values that exceed (e.g., satisfy) the one or more threshold rank values associated with PUSCH transmissions that at least partially overlap in the time domain, the UE 115 may be unable to transmit both PUSCH transmissions.

In one example, the one or more threshold rank values may include a single threshold rank value X indicating a sum rank restriction. That is, the UE 115 may be unable to transmit two PUSCH transmissions simultaneously in cases that a sum of a first rank value (e.g., a first quantity of layers) associated with a first PUSCH transmission and a second rank value (e.g., a second quantity of layers) associated with a second PUSCH transmission exceed (e.g., satisfy) the single threshold rank value X. In another example, the one or more threshold rank values may include a first threshold rank value X1 associated with PUSCH transmissions corresponding to a first CORESETPoolIndex value when there is another overlapping PUSCH transmission scheduled (e.g., associated with another CORESETPoolIndex value) and a second threshold rank value X2 associated with PUSCH transmissions corresponding to a second CORESETPoolIndex value when there is another overlapping PUSCH transmission scheduled (e.g., associated with another CORESET-PoolIndex value). That is, the threshold rank values X1 and X2 may indicate a per PUSCH rank restriction. Here, the UE 115 may be unable to transmit two PUSCH transmissions simultaneously in cases that either the first PUSCH transmission is associated with a first rank value that exceeds (e.g., satisfies) X1 or the second PUSCH transmission is associated with a second rank value that exceeds (e.g., satisfies) X2.

Additionally, for codebook-based PUSCH transmissions, a UE 115 may support, at a given time, one of various different configurations relating to how many ports the UE 115 may support for STxMP deployment (e.g., in cases that the UE 115 is scheduled to transmit two PUSCH messages that overlap in the time domain). That is, the UE 115 may be configured (e.g., via RRC signaling) or may indicate (e.g., via a capability report) one or more threshold quantities of ports associated with PUSCH transmissions that overlap in the time domain. In cases that the UE 115 is scheduled with two PUSCH transmissions associated with quantities of ports that exceed (e.g., satisfy) the one or more threshold quantities of ports associated with PUSCH transmissions that at least partially overlap in the time domain, the UE 115 may be unable to transmit both PUSCH transmissions.

In one example, the one or more threshold quantities of ports may include a single threshold quantity of ports P indicating a sum quantity of ports restriction. That is, the UE 115 may be unable to transmit two PUSCH transmissions simultaneously in cases that a sum of a first quantity of ports associated with a first PUSCH transmission and a second quantity of ports associated with a second PUSCH transmission exceed (e.g., satisfy) the single threshold quantity of ports P. In another example, the one or more threshold quantities of ports may include a first threshold quantity of ports P1 associated with PUSCH transmissions corresponding to a first CORESETPoolIndex value when there is another overlapping PUSCH transmission scheduled (e.g., associated with another CORESETPoolIndex value) and a second threshold quantity of ports P2 associated with PUSCH transmissions corresponding to a second CORE-SETPoolIndex value when there is another overlapping PUSCH transmission scheduled (e.g., associated with another CORESETPoolIndex value). That is, the threshold quantities of ports P1 and P2 may indicate a per PUSCH quantity of ports restriction. Here, the UE 115 may be unable to transmit two PUSCH transmissions simultaneously in cases that either the first PUSCH transmission is associated with a first quantity of ports that exceeds (e.g., satisfies) P1 or the second PUSCH transmission is associated with a second quantity of ports that exceeds (e.g., satisfies) P2.

In some cases, the network entity 105 may transmit multiple DCIs to the UE 115 to schedule multiple PUSCH transmissions, such that the PUSCH transmissions are scheduled dynamically (e.g., DG-PUSCH). In this example, the network entity 105 may determine whether the scheduled PUSCH transmissions may exceed the capabilities of the UE 115. For example, the network entity 105 may treat the PUSCH transmissions exceeding the UE 115 capabilities as an error case, and the network entity 105 may refrain from transmitting the DCIs scheduling overlapping PUSCH transmissions that exceed the capability of the UE 115. However, if one or more of the PUSCH transmissions are scheduled by the network entity 105 using a CG (e.g., CG-PUSCH), the network entity 105 may be unable to determine whether the PUSCH transmissions may exceed the capabilities of the UE 115. That is, it may not be possible for the network entity 105 to identify that one or more PUSCHs associated with the CG-PUSCH may overlap with another PUSCH (e.g., a DG-PUSCH or another CG-PUSCH) and cause the capabilities of the UE 115 to be exceeded.

In the example of the wireless communications system 100, in cases that the UE 115 is scheduled with two overlapping PUSCH transmissions that exceed the capabilities of the UE 115, the UE 115 may implement one or more rules to identify one of the overlapping PUSCH transmissions to refrain from transmitting (e.g., to drop). The rules may include the UE 115 dropping a PUSCH message based on the CORESET index or an SRS resource set associated with the PUSCH messages, a priority of the PUSCH messages, a starting time of the PUSCH messages, a CG configuration index associated with the PUSCH messages, a periodicity of the PUSCH messages, an MCS associated with the PUSCH messages, a transport block size of the PUSCH messages, a quantity of layers associated with the PUSCH messages, or based on one of the overlapping PUSCH messages being a DG-PUSCH message and the other of the overlapping PUSCH messages being a CG-PUSCH message. Additionally, or alternatively, the rules may indicate for the UE 115 to drop a PUSCH message based on which of the PUSCH messages is associated with a quantity of ports or rank value causing the simultaneous transmission of the PUSCH messages to exceed the threshold rank values or the threshold quantities of ports.

Figure 2:
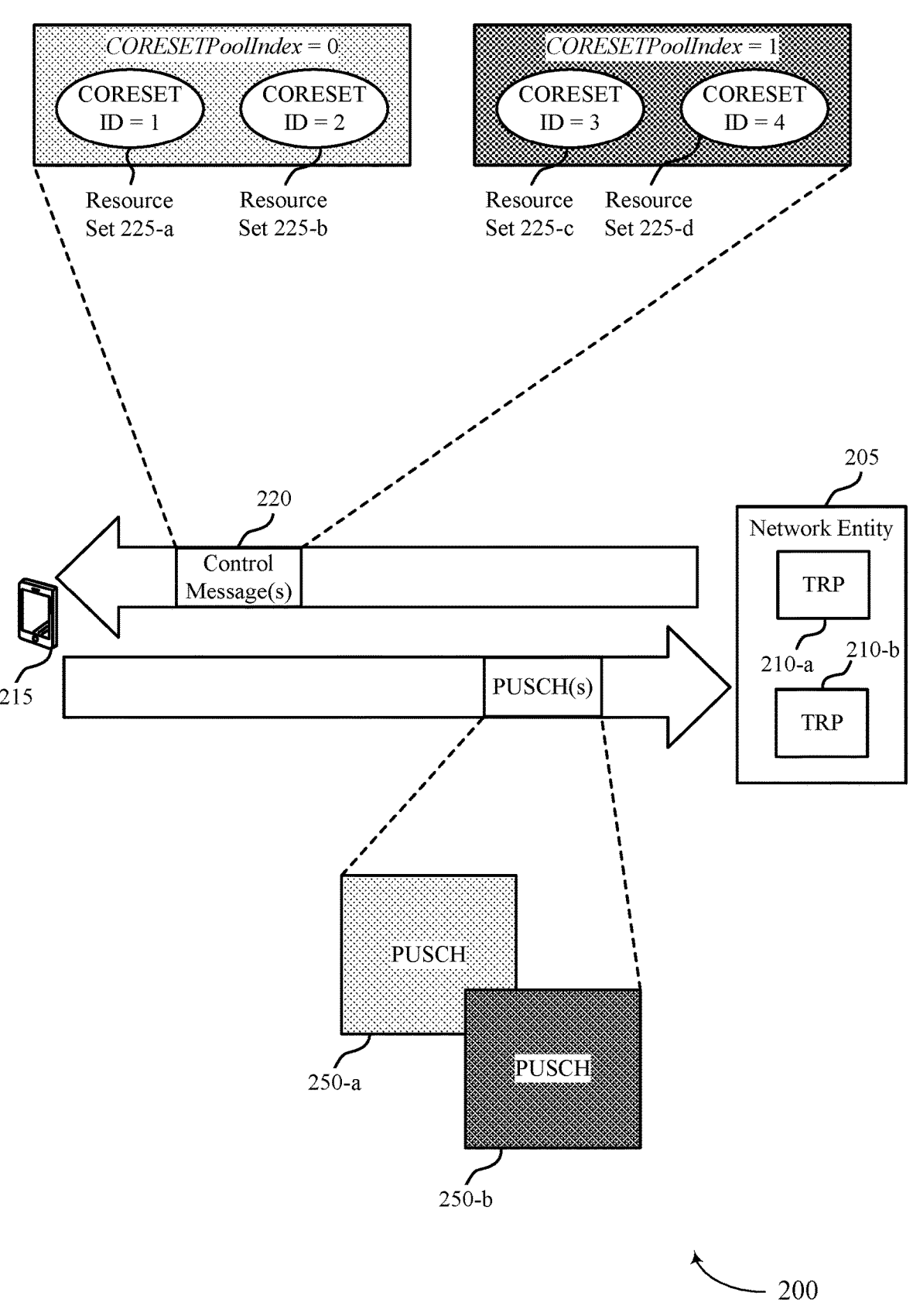

FIG. 2 illustrates an example of a wireless communications system 200 that supports rules for dropping overlapping uplink shared channel messages in accordance with one or more aspects of the present disclosure. The wireless communications system 200 may implement or be implemented to realize or facilitate aspects of the wireless communications system 100. For example, the wireless communications system 200 illustrates communication between a UE 215 and a network entity 205 via a TRP 210-a or a TRP 210-b, or both. The UE 215, the network entity 205, the TRP 210-a, and the TRP 210-b may be examples of corresponding devices illustrated by and described with reference to FIG. 1. In some implementations the UE 215 and the network entity 205 may support dropping rules based on the UE 215 performing one or more PUSCH transmissions scheduled by the network entity 205.

The UE 215 and the network entity 205 may communicate via uplink and downlink communication links. The UE 215 and the network entity 205 may use the communication links to transmit signaling to one or both of the TRP 210-a and the TRP 210-b and may receive signaling from one or both of the TRP 210-a and the TRP 210-b.

The network entity 205 may transmit one or more control messages 220 to the UE 215. The control messages 220 may be DCIs. The control messages 220 may include information to indicate the resource sets 225 (e.g., SRS resource sets). For example, the control message 220 may include indication of up to five CORESETs, each associated with a CORESET identifier (e.g., a CORESET ID). Additionally, each CORESET may correspond to various resource sets 225. Thus, each resource set 225 may be associated with a CORESET identifier (CORESET ID). For example, the resource set 225-a may be associated with the CORESET ID=1, the resource set 225-b may be associated with the CORESET ID=2, the resource set 225-b may be associated with the CORESET ID=3, and the resource set 225-d may be associated with the CORESET ID=4.

Additionally, or alternatively, the control messages 220 may indicate, for each CORESET (e.g., and each associated resource set 225), a corresponding CORESETPoolIndex value (e.g., a CORESET index). In some cases, each CORE-SETPoolIndex value may correspond to different TRPs 210. For example, the CORESETPoolIndex value=0 may correspond to the TRP 210-a and the CORESETPoolIndex value=1 may correspond to the TRP 210-b. In the example of the wireless communications system 200, the UE 215 may be configured (e.g., via the one or more control messages 220) by a higher layer parameter PDCCH-Config that contains two different values of CORESETPoolIndex of CORESETs for the active BWP of a serving cell.

The network entity 205 may additionally transmit one or more control messages 220 to schedule the PUSCHs 250. For example, the network entity 205 may transmit a first control message 220 scheduling one or more CG-PUSCH messages including the PUSCH 250-a. Here, the network entity 205 may transmit the control message 220 via RRC signaling (e.g., for UL CG Type 1) or via DCI signaling (e.g., for UL CG Type 2). The PUSCH 250-a may be associated with a first resource set 225 that is associated with the first CORESETPoolIndex value=0 (e.g., the resource set 225-a or the resource set 225-b) and the UE 215 may be configured to transmit the PUSCH 250-a to the TRP 210-a. Additionally, the PUSCH message 250-a may be associated with a first rank value (e.g., corresponding to a first quantity of layers) and a first quantity of ports.

In some cases, the network entity 205 may additionally transmit another control message 220 to schedule a second PUSCH 250-b that overlaps at least partially in the time domain with the PUSCH 250-a. For example, the network entity 205 may transmit another control message 220 scheduling one or more second CG-PUSCH messages including the PUSCH 250-b. In another example, the network entity 205 may transmit another control message 220 scheduling a DG-PUSCH message comprising the PUSCH 250-b. In either case, the PUSCH 250-b may be associated with a second resource set 225 that is associated with the second CORESETPoolIndex value=1 (e.g., the resource set 225-c or the resource set 225-c) and the UE 215 may be configured to transmit the PUSCH 250-b to the TRP 210-b. Additionally, the PUSCH message 250-b may be associated with a second rank value (e.g., corresponding to a second quantity of layers) and a second quantity of ports.

Prior to transmitting the PUSCHs 250-a and 250-b that are scheduled to be overlapping in the time domain, the UE 215 may determine whether the rank values and the quantities of ports associated with both overlapping PUSCHs 250 satisfy (e.g., exceed) threshold rank values or threshold quantities of ports that are associated with overlapping PUSCHs 250.

That is, the UE 215 may be configured (e.g., by a control message 220 received via RRC signaling) or may indicate (e.g., via a capability report transmitted to the network entity 205) one or more threshold rank values associated with PUSCH transmissions that overlap in the time domain. In some examples, the threshold rank values may be RRC configured by the network entity 205 for each component carrier, BWP, or CG configuration. For CG configuration-based thresholds, the behavior of the UE 215 (e.g., the dropping rules) may be applicable for each of the CG configurations. In cases that the UE 215 is scheduled with two PUSCH transmissions associated with rank values that exceed (e.g., satisfy) the one or more threshold rank values associated with PUSCH transmissions that overlap in the time domain, the UE 215 may be unable to transmit both PUSCH transmissions. For example, if the UE 215 is configured with an aggregate threshold rank value X, if a sum of the first rank value associated with the PUSCH 250-a and the second rank value associated with the PUSCH 250-b exceeds the aggregate threshold rank value X, the UE 215 may be unable to transmit both the PUSCH 250-a and the PUSCH 250-b simultaneously. In another example, if the UE 215 is configured with per PUSCH threshold rank values X1 and X2, if the first rank value of the PUSCH 250-a satisfies (e.g., exceeds) X1 or if the second rank value of the PUSCH 250-b satisfies (e.g., exceeds) X2, the UE 215 may be unable to transmit both the PUSCH 250-a and the PUSCH 250-b simultaneously.

Additionally, the UE 215 may be configured (e.g., by a control message 220 received via RRC signaling) or may indicate (e.g., via a capability report transmitted to the network entity 205) one or more threshold quantities of ports associated with PUSCH transmissions that overlap in the time domain. In some examples, the threshold quantities of ports may be RRC configured by the network entity 205 for each component carrier, BWP, or CG configuration. For CG configuration, the behavior of the UE 215 (e.g., the dropping rules) may be applicable for each of the CG configurations. In cases that the UE 215 is scheduled with two PUSCH transmissions associated with quantities of ports that exceed (e.g., satisfy) the one or more threshold quantities of ports associated with PUSCH transmissions that overlap in the time domain, the UE 215 may be unable to transmit both PUSCH transmissions. For example, if the UE 215 is configured with an aggregate threshold quantity of ports P, if a sum of the first quantity of ports associated with the PUSCH 250-a and the second quantity of ports associated with the PUSCH 250-b exceeds the aggregate threshold quantity of ports P, the UE 215 may be unable to transmit both the PUSCH 250-a and the PUSCH 250-b simultaneously. In another example, if the UE 215 is configured with per PUSCH threshold quantities of ports P1 and P2, if the first quantity of ports of the PUSCH 250-a satisfies (e.g., exceeds) P1 or if the second quantity of ports of the PUSCH 250-b satisfies (e.g., exceeds) P2, the UE 215 may be unable to transmit both the PUSCH 250-a and the PUSCH 250-b simultaneously.

In cases that the UE 215 determines that the rank values of the PUSCHs 250-a and 250-b and the quantities of ports of the PUSCHs 250-a and 250-b do not exceed (e.g., do not satisfy) the one or more threshold rank values or threshold quantities of ports associated with PUSCH transmissions that overlap in the time domain, the UE 215 may determine to transmit both PUSCHs 250-a and 250-b. Additionally, in cases that the UE 215 determines that the rank values of the PUSCHs 250-a and 250-b or the quantities of ports of the PUSCHs 250-a or 250-b exceed (e.g., satisfy) the one or more threshold rank values or threshold quantities of ports associated with PUSCH transmissions that overlap in the time domain, the UE 215 may identify one of the PUSCHs 250 to refrain from transmitting (e.g., to drop) and may transmit only one of the PUSCHs 250-a or 250-b.

The wireless communications system 200 may support techniques at the UE 215 to determine one or more PUSCHs 250 to drop in order to prevent the UE 215 from transmitting overlapping PUSCHs 250 that exceed a capability of the UE 215. For example, the UE 215 implement one or more rules (e.g., dropping rules) to identify which of the PUSCHs 250 to refrain from transmitting in cases that one or more of the threshold rank values or threshold quantities of ports are satisfied by the overlapping PUSCHs 250.

For example, in cases that the UE 215 is configured with per PUSCH thresholds (e.g., a per PUSCH threshold quantities of ports P1 and P2, per PUSCH threshold rank values X1 and X2), the one or more rules may indicate for the UE

215 to drop the PUSCH 250 that satisfies the per PUSCH threshold quantity in cases that one of the PUSCHs 250 satisfies the per PUSCH threshold quantity and the other PUSCH 250 fails to satisfy the per PUSCH threshold quantity. For example, in cases that the threshold quantities of ports P1 and P2 are both equal to two, if the PUSCH 250-*a* is associated with two ports while the PUSCH 250-*b* is associated with four ports, the UE 215 may refrain from transmitting the PUSCH 250-*b* (e.g., and may transmit the PUSCH 250-*a*). Additionally, in cases that the threshold rank values X1 and X2 are both equal to two, if the PUSCH 250-*a* is associated with a rank of three and the PUSCH 250-*b* is associated with a rank of two, the UE 215 may refrain from transmitting the PUSCH 250-*a* and may transmit the PUSCH 250-*b*.

For example, the UE 215 may determine which of the PUSCHs 250 to refrain from transmitting based on the CORESETPoolIndex value or the resource set 225 associated with the PUSCH 250. That is, the one or more dropping rules may indicate for the UE 215 to drop PUSCHs 250 associated with the CORESETPoolIndex value=0 (resulting in the UE 215 dropping the PUSCH 250-*a*) or the CORESETPoolIndex value=1 (resulting in the UE 215 dropping the PUSCH 250-*b*). Additionally, or alternatively, the one or more rules may indicate for the UE 215 to drop PUSCHs 250 associated with a certain resource set 225 (e.g., SRS resource set 225). Here, the UE 215 may refrain from transmitting the PUSCH associated with the indicated resource set 225.

In another example, the UE 215 may determine to drop the PUSCH 250 associated with the lowest priority. That is, the one or more rules may indicate for the UE 215 to drop the PUSCH 250 that is associated with a relatively lower priority. The priorities of the PUSCHs 250 may be communicated to the UE 215 (e.g., by the network entity 205) within a parameter (e.g., lch-basedPrioritization) as part of the control messages 220. The parameter may indicate a logical channel priority, a physical layer priority, or both. In either case, the UE 215 may transmit the PUSCH 250 associated with the higher priority while refraining from transmitting the PUSCH 250 associated with the lower priority.

In another example, the UE 215 may determine which PUSCH 250 to drop based on which PUSCH 250 is configured to be transmitted by the UE 215 later in the time domain (e.g., the PUSCH 250 that starts later). That is, the one or more rules may indicate for the UE 215 to drop the PUSCH 250 that starts later in time. Here, the UE 215 may transmit the PUSCH 250-*a* (e.g., which starts prior to the PUSCH 250-*b*) and may refrain from transmitting the PUSCH 250-*b*.

In another example, the UE 215 may determine which of the PUSCHs 250 to drop based on the CG configuration index. For example, in cases that both the PUSCH 250-*a* and 250-*b* are both CG-PUSCHs 250, both PUSCHs 250-*a* and 250-*b* may be associated with a respective CG configuration index. Here, the one or more rules may indicate for the UE 215 to drop the PUSCH 250 having the lower or higher CG configuration index. In this example, the UE 215 may compare the CG configuration indices of both PUSCHs 250 and refrain from transmitting the PUSCH 250 having either the higher or lower CG configuration index (e.g., based on whether the rule indicates for the UE 215 to drop the PUSCH 250 associated with the higher or lower index). Additionally, or alternatively, the UE 215 may determine which of the PUSCHs 250 to drop based on a periodicity of the PUSCHs 250. For example, in cases that both the PUSCH 250-*a* and 250-*b* are both CG-PUSCHs 250 (and both configured with a respective periodicity), the one or more rules may indicate for the UE 215 to drop the PUSCH 250 associated with a longer or shorter periodicity. Here, the UE 215 may compare the periodicities of the PUSCHs 250 and refrain from transmitting the PUSCH 250 associated with either the higher or lower periodicity (e.g., based on whether the rules indicate for the UE 215 to refrain from transmitting the PUSCH 250 associated with the higher or lower periodicity).

In some other examples, the UE 215 may determine which of the PUSCHs 250 to drop based on one or more of the MCS or transport block size of the PUSCHs. In this example, the one or more rules may indicate for the UE 215 to refrain from transmitting the PUSCH 250 with either a higher or lower MCS or transport block size (e.g., in accordance with the rule).

In some examples, the network entity 205 may transmit multiple control messages 220 configuring the UE 215 to transmit multiple first PUSCHs 250 (e.g., first CG-PUSCHs) and multiple second PUSCHs 250 (e.g., second CG-PUSCHs). The multiple first PUSCHs 250 and the multiple second PUSCHs 250 may overlap at least partially in the time domain. The UE 215 may determine which of the PUSCHs 250 to drop by determining a first PUSCH 250 of the first PUSCHs 250 associated with a first CORESET-PoolIndex value (e.g., 0) and a second PUSCH 250 of the second PUSCHs 250 associated with a second CORESET-PoolIndex value (e.g., 1). The UE 215 may select a PUSCH 250 from each set of PUSCHs 250 based on the PUSCH 250 satisfying the thresholds configured by the network entity 205. In some examples, the UE 215 may determine which of the PUSCHs 250 to transmit based on the priority parameter (e.g., lch-basedPrioritization). For example, the UE 215 may drop the PUSCH 250 associated with the lowest priority. However, in the case that the PUSCHs 250 have a same priority, the UE 215 may determine which of the PUSCHs to drop using one or more other rules (e.g., based on one or more of logical channel priority, periodicity, start time, MCS, or transport block size). Additionally, or alternatively, the UE 215 may select a single PUSCH 250 from both sets of PUSCHs 250 to transmit (e.g., in cases that the UE 215 may select a single PUSCH 250 from both sets of PUSCHs 250 such that the rank values and quantities of ports associated with the selected PUSCHs 250 fail to satisfy the threshold quantities of ports or the threshold rank values associated with PUSCH transmissions that overlap at least partially in the time domain).

Additionally, or alternatively, in cases that the PUSCH 250-*a* is a CG-PUSCH 250-*a* and the PUSCH 250-*b* is a DG-PUSCH 250-*b*, the UE 215 may determine to drop the CG-PUSCH 250-*a*. For example, the one or more rules may indicate for the UE 215 to drop the PUSCH 250-*a* that is a CG-PUSCH 250-*a* and transmit the PUSCH 250-*b* that is a DG-PUSCH 250-*b*. In some instances, the UE 215 may implement this rule in cases that the TRPs 210 are associated with a non-ideal backhaul network entity 205. In other examples where the PUSCH 250-*a* is a CG-PUSCH 250-*a* and the PUSCH 250-*b* is a DG-PUSCH 250-*b*, the UE 215 may implement one or more other rules to identify which of the PUSCHs 250 to drop (e.g., to refrain from transmitting).

Figure 3:
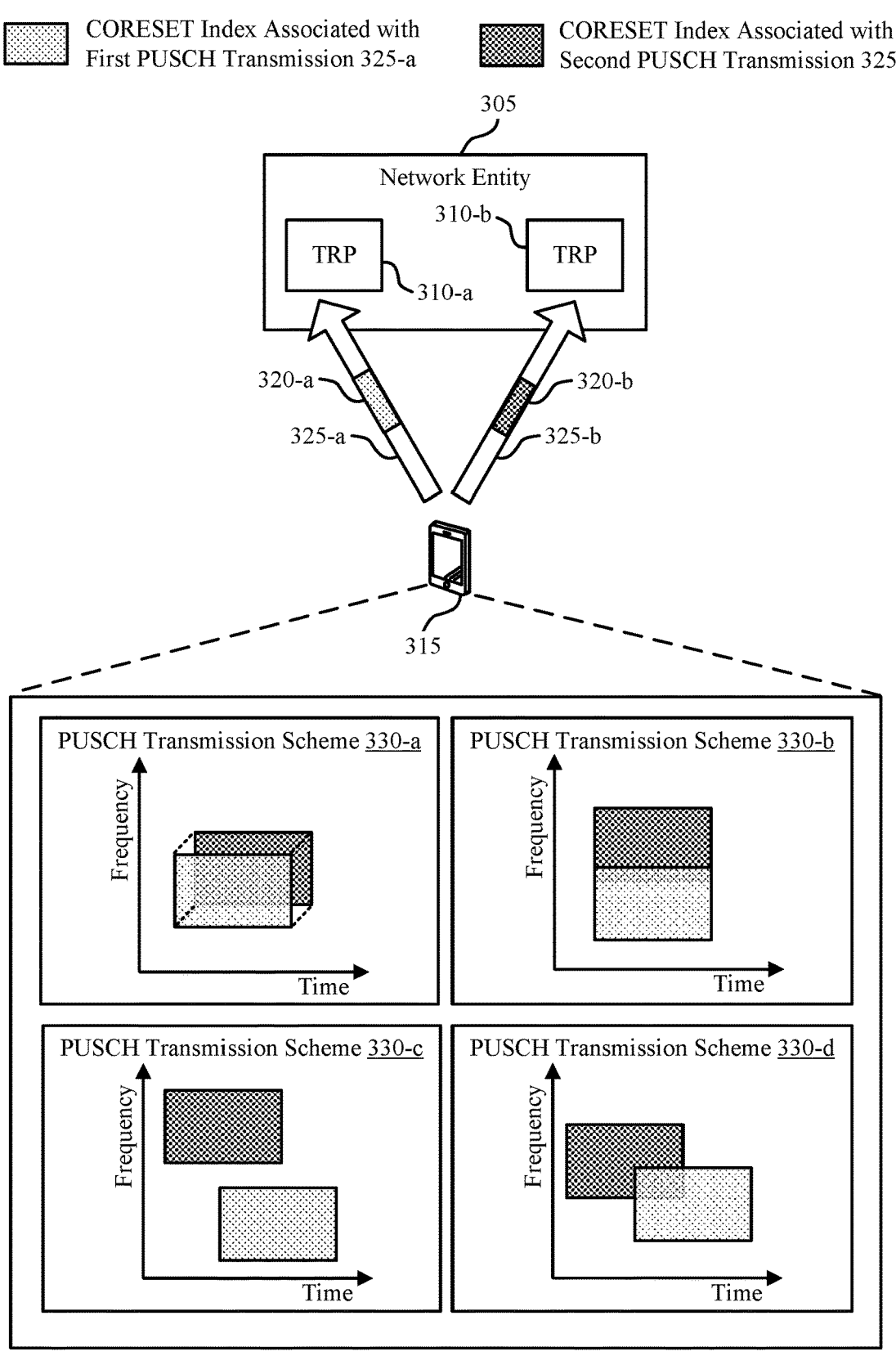
FIGS. 3 and 4 illustrate examples of uplink transmission schemes that support rules for dropping overlapping uplink shared channel messages in accordance with one or more aspects of the present disclosure.

FIG. 3 illustrates an example of an uplink transmission scheme 300 that supports rules for dropping overlapping uplink shared channel messages in accordance with one or more aspects of the present disclosure. The uplink transmission scheme 300 may implement or be implemented to realize or facilitate aspects of the wireless communications system 100 or the wireless communications system 200. For example, the uplink transmission scheme 300 illustrate communication between a UE 315 and a network entity 305 associated with a TRP 310-*a* and a TRP 310-*b*, which may be examples of corresponding devices as illustrated by and described with reference to FIGS. 1 and 2.

In some examples, the uplink transmission scheme 300 may illustrate multiple PUSCH transmissions from a single UE 315 to multiple TRPs 310 of a network entity 305 via different uplink communication links 325. The different uplink communication links 325 (e.g., link 325-*a* and link 325-*b*) may be associated with different CORESET index values (e.g., different CORESETPoolIndex values), different TRPs, and different resource sets. As described in the example of FIG. 3, the UE 315 and the network entity 305 may support multi-DCI based multi-TRP framework, where the two PUSCHs 320 are associated with different CORE-SET index values. The first PUSCH 320-*a* (associated with CORESET index value 0) may be associated with a first resource set, and may be transmitted using a first beam or TCI state or power control parameters or precoder. Similarly, the second PUSCH 320-*b* (associated with CORESET index value=1) may be associated with the second resource set, and may be transmitted using a second beam or TCI state or power control parameters or precoder.

In some examples, two different PUSCHs in the same serving cell or component carrier may partially or fully overlap in at least the time domain. The PUSCHs may overlap or may not overlap in the frequency domain. In the example of the PUSCH transmission scheme 330-*a*, the first PUSCH and the second PUSCH may overlap both in time and in frequency. In the example of the PUSCH transmission scheme 330-*b*, the first PUSCH and the second PUSCH overlap in time but not in frequency. In the example of the PUSCH transmission scheme 330-*c*, the first PUSCH and the second PUSCH partially overlap in the time domain but do not overlap in the frequency domain. In the example of the PUSCH transmission scheme 330-*d*, the first PUSCH and the second PUSCH partially overlap in both the time domain and frequency domain.

In some cases, the UE 315 may be configured with a threshold rank value associated with PUSCH transmissions 320 that overlap in the time domain, a threshold quantity of ports associated with PUSCH transmissions 320 that overlap in the time domain, or both. If the multiple PUSCH trans-missions 320 that are scheduled to overlap in the time domain are associated with rank values or quantities of ports that exceed the threshold rank values or the threshold quantities of ports, the UE 315 may be unable to transmit the multiple PUSCH transmissions 320 that are scheduled to overlap in the time domain.

In the example of the uplink transmission scheme 300, the UE 315 may implement a set of rules for dropping (e.g., for refraining from transmitting) one PUSCH transmissions 320 that is scheduled to overlap at least partially in time with another PUSCH transmission 320 in cases that the UE 315 is unable to transmit both PUSCH transmissions 320 (e.g., due to the rank values or quantities of ports associated with both PUSCH transmissions 320 exceeding the threshold rank values or the threshold quantities of ports associated with PUSCH transmissions 320 that overlap in the time domain). The rules may include the UE 315 dropping a PUSCH transmission 320 based on the CORESET index or an SRS resource set associated with the PUSCH transmis-sion 320, a priority of the PUSCH transmission 320, a starting time of the PUSCH transmissions 320, a CG con-figuration index associated with the PUSCH transmissions

320, a periodicity of the PUSCH transmissions 320, an MCS associated with the PUSCH transmissions 320, a transport block size of the PUSCH transmissions 320, a quantity of layers associated with the PUSCH transmissions 320, or based on one of the overlapping PUSCH transmissions 320 being a DG-PUSCH message and the other of the overlap-ping PUSCH messages being a CG-PUSCH message. Addi-tionally, or alternatively, the rules may indicate for the UE 315 to drop a PUSCH transmission 320 based on which of the PUSCH transmissions 320 is associated with a quantity of ports or rank value causing the simultaneous transmission of the PUSCH transmissions 320 to exceed the threshold rank values or the threshold quantities of ports.

Figure 4:
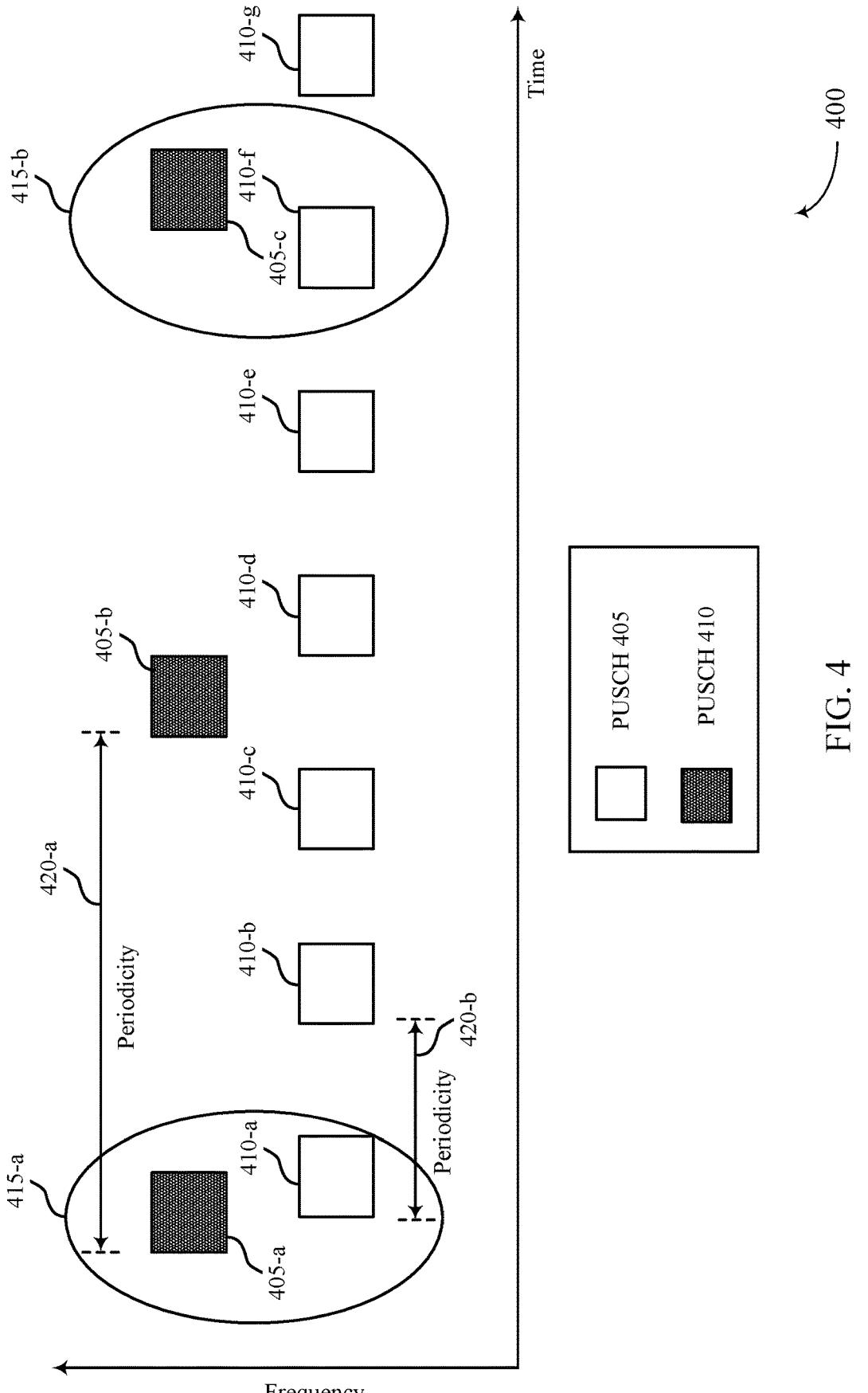

FIG. 4 illustrates an example of an uplink transmission scheme 400 that supports rules for dropping overlapping uplink shared channel messages in accordance with one or more aspects of the present disclosure. The uplink transmis-sion scheme 400 may implement or be implemented to realize or facilitate aspects of the wireless communications systems as described with reference to FIGS. 1 through 3.

In some examples, a network entity may transmit multiple control messages to a UE to schedule multiple PUSCH transmissions, such that the PUSCH transmissions (e.g., PUSCHs 405 and PUSCHs 410). In this example, the PUSCHs 405 (e.g., PUSCH 405-*a*, PUSCH 405-*b*, PUSCH 405-*c*) and 410 (e.g., PUSCH 410-*a* through PUSCH 410-*g*) are each CG-PUSCHs. That is, the UE may receive a first control message from a network entity indicating the first set of PUSCHs 405, which are associated with a first rank value, a first quantity of ports, and a first periodicity 420-*a*. Additionally, the UE may receive a second control message from the network entity indicating the second set of PUSCHs 410, which may be associated with a second rank value, a second quantity of ports, and a second periodicity 420-*b*. In some instances, the network entity may not refrain from scheduling overlapping CG-PUSCHs 405 and 410 that exceed the capabilities of the UE (e.g., in cases that the network entity includes multiple non-ideal backhaul TRPs).

In the example of the uplink transmission scheme 400, the CG-PUSCHs 405 and 410 may have different periodicities 420, which may result in the two PUSCHs 405 and 410 overlapping at least partially in time. For example, a first set of PUSCHs 405 may be associated with a relatively longer periodicity 420-*a*. The second set of PUSCHs 410 may be associated with a relatively shorter periodicity 420-*b*. The PUSCHs 405 and the PUSCHs 410 may overlap multiple times throughout the time domain, as seen in instance 415-*a* and instance 415-*b*. For example, in instance 415-*a*, PUSCH 405-*a* and PUSCH 410-*a* may overlap, and in instance 415-*b*, PUSCH 405-*c* and PUSCH 410-*f* may overlap.

In some cases, the overlapping PUSCH 405 and 410 may exceed a capability of the UE. For example, in cases that the UE is configured with an aggregate threshold rank value (e.g., X) associated with overlapping PUSCH transmissions, an aggregate threshold quantity of ports (e.g., P) associated with overlapping PUSCH transmissions, per PUSCH thresh-old rank values (e.g., X1 and X2) associated with overlap-ping PUSCH transmissions, per PUSCH threshold quantities of ports (e.g., P1 and P2), or a combination thereof. In cases that the rank values or quantities of ports associated with the PUSCHs 405 and 410 satisfies the one or more threshold rank values or threshold quantities of ports, the UE may be unable to transmit PUSCHs 405 and 410 simultaneously. In these cases, the UE may implement a set of rules (e.g., dropping rules) to identify which of the PUSCHs 405 or 410 to refrain from transmitting.

The rules may include the UE dropping a PUSCH 405 or 410 based on the CORESET index or an SRS resource set associated with the PUSCH 405 or 410, a priority of the PUSCHs 405 or 410, a starting time of the PUSCHs 405 or 410, a CG configuration index associated with the PUSCHs 405 or 410, a periodicity 420 of the PUSCHs 405 or 410, an MCS associated with the PUSCHs 405 or 410, a transport block size of the PUSCHs 405 or 410, or a quantity of layers associated with the PUSCHs 405 or 410. Additionally, or alternatively, the rules may indicate for the UE to drop a PUSCH 405 or 410 based on which of the PUSCHs 405 or 410 is associated with a quantity of ports or rank value causing the simultaneous transmission of the PUSCHs 405 or 410 messages to exceed the threshold rank values or the threshold quantities of ports.

Figure 5:
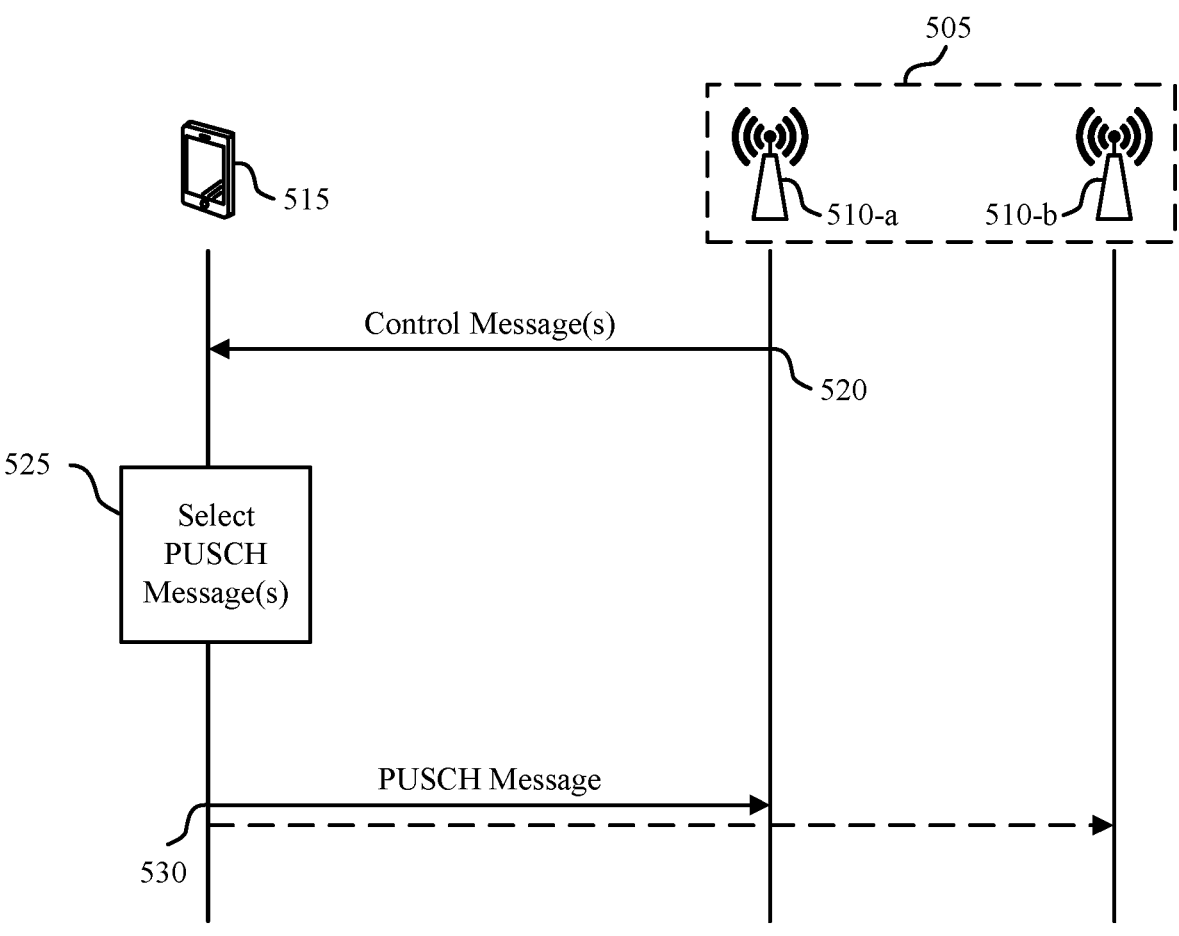
FIG. 5 illustrates an example of a process flow in a system that supports rules for dropping overlapping uplink shared channel messages in accordance with one or more aspects of the present disclosure.

FIG. 5 illustrates an example of a process flow 500 in a system that supports rules for dropping overlapping uplink shared channel messages in accordance with one or more aspects of the present disclosure. The process flow 500 may implement or be implemented by aspects of the wireless communications systems 100 or 200. For example, process flow 500 may be implemented by UE 515 and network entity 505, which may each represent examples of a UE 115 and a network entity 105 described with reference to FIGS. 1 through 4. Process flow 500 may be implemented by UE 515 and network entity 505 associated with a TRP 510-*a* and a TRP 510-*b*, which may be examples of corresponding devices as illustrated by and described with reference to FIGS. 1 and 2.

In the following description of the process flow 500, the operations may be performed in a different order than the order shown, or the operations performed by the example devices may be performed in different orders or at different times. For example, specific operations may also be left out of the process flow 500, or other operations may be added to the process flow 500. Although UE 515 and network entity 505 are shown performing the operations of the process flow 500, some aspects of some operations may also be performed by one or more other wireless devices.

At 520, network entity 505 may transmit a first control message to a UE 515. The first control message may indicate a set of first PUSCH messages that have a first periodicity, and the set of first PUSCH messages may include a first PUSCH message associated with a first rank value and a first quantity of ports. In some examples, the network entity 505 may transmit a second control message to the UE. The second control message may indicate a second PUSCH message that may be associated with a second rank value and a second quantity of ports. The second PUSCH message may overlap at least partially in a time domain with the first PUSCH message.

In some examples, the second control message may indicate a set of second PUSCH messages including the second PUSCH message. The set of second PUSCH messages may have a second periodicity. In some examples, the first control message may indicate that a set of first PUSCH messages may be a CG-PUSCH message. The second control message may include downlink control information indicating the second PUSCH message may be a DG-PUSCH message.

Additionally, or alternatively, the second control message may indicate a set of second PUSCH messages that may include the second PUSCH message. The set of second PUSCH message may have a second periodicity. In some examples, the first control message may indicate multiple PUSCH messages including the first PUSCH message, and the multiple PUSCH messages may overlap partially in the time domain. The second control message may indicate multiple PUSCH messages including the second PUSCH message, and the multiple PUSCH messages may overlap partially in the time domain.

At 525, the UE 515 may select the first PUSCH message from the multiple PUSCH messages based on the first PUSCH message having a higher priority than the remaining PUSCH messages of the multiple PUSCH messages, the second PUSCH message having a higher priority than the remaining PUSCH messages of the multiple PUSCH messages, the first rank value, the second rank value, or the sum of the first rank value and the second rank value being less than or equal to the threshold rank value, the first quantity of ports, the second quantity of ports or the sum of the first quantity of ports and the second quantity of ports being less than or equal to the threshold quantity of ports, or a combination, where the first PUSCH message, the second PUSCH message, or both is based on selecting the first PUSCH message and the second PUSCH message.

At 530, the UE 515 may transmit the first PUSCH message, the second PUSCH message or both to the network entity 505. In some examples, the UE 515 may transmit the one or more PUSCH messages based on whether the first rank value, the second rank value, or a sum of the first rank value and the second rank value satisfies a threshold rank value associated with PUSCH transmissions that overlap in the time domain. In some examples, the UE 515 may transmit the one or more PUSCH messages based on whether the first quantity of ports, the second quantity of ports, or a sum of the first quantity of ports and the second quantity of ports satisfies a threshold quantity of ports associated with PUSCH transmissions that overlap in the time domain.

Additionally, or alternatively, the UE 515 may transmit the first PUSCH message, and the UE 515 may refrain from transmitting the second PUSCH message based on the first rank value, the second rank value, or the sum of the first rank value and the second rank value satisfying the threshold rank value. In some examples, the UE 515 may refrain from transmitting the second PUSCH message based on the first quantity of ports, the second quantity of ports, or the sum of the first quantity of ports and the second quantity of ports satisfying the threshold quantity of ports. In some examples, the UE 515 may transmit the first PUSCH message and refrain from transmitting the second PUSCH message based on control resource index associated with the second PUSCH message, an SRS resource set associated with the second PUSCH message, or both. The UE 515 may refrain from transmitting a PUSCH message associated with the control resource set index or the SRS resource set when one or more messages indicate that PUSCH messages may overlap in the time domain. In some examples, the UE 515 may refrain from transmitting a PUSCH message based on one or more rank value associated with the PUSCH message that overlap in the time domain satisfying the threshold rank value or one or more quantities of ports associated with the PUSCH messages that overlap in the time domain satisfy the threshold quantity of ports.

Additionally, or alternatively, the UE 515 may transmit the first PUSCH message and refrain from transmitting the second PUSCH message based on first priority associated with the first PUSCH message being greater than a second priority associated with the second PUSCH message. In some examples, the UE 515 may transmit the first PUSCH message and refrain from transmitting the second PUSCH message based on a first starting position of the first PUSCH message being prior to a second starting position of the second PUSCH message. In some examples, the UE 515 may transmit the first PUSCH message and refrain from transmitting the second PUSCH message when the second PUSCH message overlaps in the time domain with another PUSCH message and one or more rank values associated with the PUSCH messages that overlap in the time domain satisfies the threshold rank or one or more quantities of ports associated with the PUSCH messages that overlap in the time domain satisfies the threshold quantity of ports.

Additionally, or alternatively, the UE 515 may refrain from transmitting the second PUSCH message from the set of second PUSCH messages based on a second CG configuration index associated with the set of second PUSCH messages being greater than a first CG configuration index associated with the set of first PUSCH messages or the second CG configuration index being less than the first CG configuration index. In some examples, the UE 515 may refrain from transmitting the PUSCH messages from the set of second PUSCH messages based on the second periodicity of the set of second PUSCH messages being greater than the first periodicity of the set of first PUSCH messages or the second periodicity of the set of second PUSCH messages being less than the first periodicity of the set of first PUSCH messages.

Additionally, or alternatively, the UE 515 may transmit the first PUSCH message and refrain from transmitting the second PUSCH message based on a first comparison between a first MCS associated with the first PUSCH message and a second MCS associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

In some examples, the threshold quantity of ports associated with PUSCH transmissions that overlap in the time domain may include a first threshold quantity of ports associated with the set of first PUSCH messages and a second threshold quantity of ports associated with the second PUSCH message, and the UE 515 may transmit the first PUSCH message and refrain from transmitting the second PUSCH message may be based on the first quantity of ports associated with the set of first PUSCH messages being less than or equal to the first threshold quantity of ports, and the second quantity of ports associated with the second PUSCH message being greater than the second threshold quantity of ports.

Additionally, or alternatively, the UE 515 may transmit the first PUSCH message, the second PUSCH message, or both may include refraining from transmitting the first PUSCH message and transmitting the second PUSCH message based on the first rank value, the second rank value, or the sum of the first rank value and the second rank value satisfying the threshold rank value, or the first quantity of ports, the second quantity of ports, or the sum of the first quantity of ports and the second quantity of ports satisfying the threshold quantity of ports. In some examples, the UE 515 may refrain from transmitting the first PUSCH message and may transmit the second PUSCH message based on the first PUSCH message being a CG-PUSCH message and the second PUSCH message being the DG-PUSCH message.

In some examples, the threshold rank value associated with PUSCH transmissions that overlap in the time domain may correspond to an aggregate threshold rank value the UE 515 is capable of supporting for PUSCH transmissions that overlap in the time domain. The UE 515 transmitting the first PUSCH message, the second PUSCH message, or both may be based on whether the sum of the first rank value and the second rank value satisfies the threshold rank value. Additionally, or alternatively, the threshold rank value associated with PUSCH transmissions that overlap in the time domain may include a first threshold rank value associated with the set of first PUSCH messages and a second threshold rank value associated with the second PUSCH message. In some examples, the UE 515 may refrain from transmitting the first PUSCH message and may transmit the second PUSCH message based on whether the first rank value satisfies the first threshold rank value or the second rank value satisfies the second threshold rank value.

Additionally, or alternatively, the threshold quantity of ports associated with PUSCH transmissions that overlap in the time domain may correspond to an aggregate threshold quantity of ports the UE 515 is capable of supporting for PUSCH transmissions that overlap in the time domain. In some examples, the UE 515 may refrain from transmitting the first PUSCH message and may transmit the second PUSCH message based on whether the sum of the first quantity of ports and the second quantity of ports satisfies the threshold quantity of ports. Additionally, or alternatively, the threshold quantity of ports associated with PUSCH transmissions that overlap in the time domain may correspond to a first threshold quantity of ports associated with the set of first PUSCH messages and a second threshold quantity of ports associated with the second PUSCH message. In some examples, the UE 515 may refrain from transmitting the first PUSCH message and may transmit the second PUSCH message based on whether the first quantity of ports satisfies the first threshold quantity of ports or the second quantity of ports satisfies the second threshold quantity of ports.

Additionally, or alternatively, the UE 515 may transmit the first PUSCH message and the second PUSCH message based on the first rank value, the second rank value, or the sum of the first rank value and the second rank value being less than or equal to the threshold rank value, and the first quantity of ports, the second quantity of ports, or the sum of the first quantity of ports and the second quantity of ports being less than or equal to the threshold quantity of ports.

Figure 6:
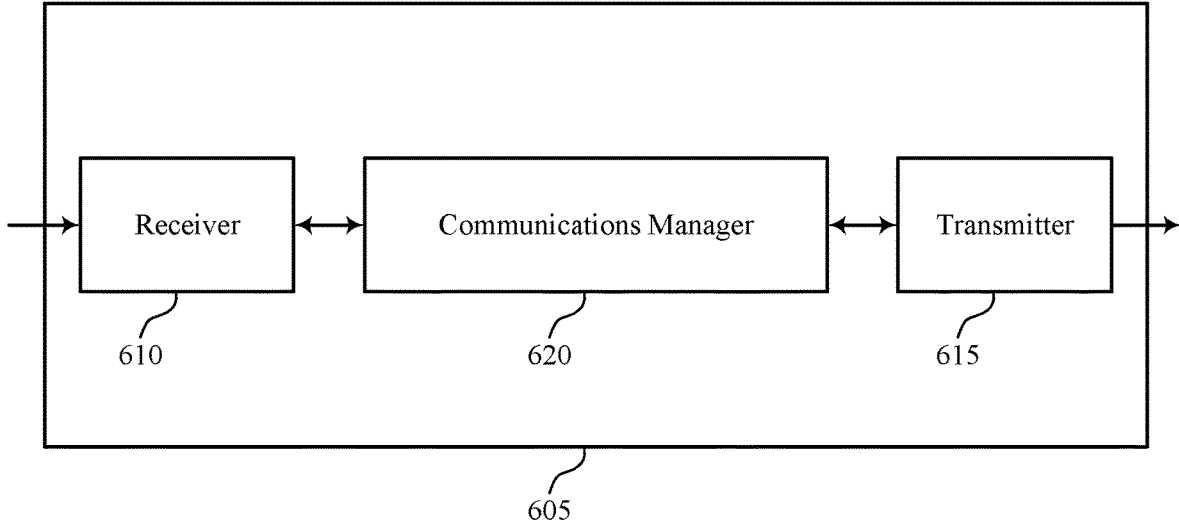
FIGS. 6 and 7 show block diagrams of devices that support rules for dropping overlapping uplink shared channel messages in accordance with one or more aspects of the present disclosure.

FIG. 6 shows a block diagram 600 of a device 605 that supports rules for dropping overlapping uplink shared channel messages in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to rules for dropping overlapping uplink shared channel messages). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to rules for dropping overlapping uplink shared channel messages). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of rules for dropping overlapping uplink shared channel messages as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communications in accordance with examples as disclosed herein. For example, the communications manager 620 may be configured as or otherwise support a means for receiving a first control message indicating a set of first PUSCH messages that have a first periodicity, the set of first PUSCH messages including a first PUSCH message associated with a first rank value and a first quantity of ports. The communications manager 620 may be configured as or otherwise support a means for receiving a second control message indicating a second PUSCH message that is associated with a second rank value and a second quantity of ports, where the second PUSCH message overlaps at least partially in a time domain with the first PUSCH message. The communications manager 620 may be configured as or otherwise support a means for transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

By including or configuring the communications manager 620 in accordance with examples as described herein, the device 605 (e.g., a processor controlling or otherwise coupled with the receiver 610, the transmitter 615, the communications manager 620, or a combination thereof) may support techniques for reduced processing and reduced power consumption. For example, by dropping overlapping uplink shared channel messages, the processor of the device 605 may refrain from processing (e.g., monitoring and performing channel measurements) on each resource in a resource pool.

Figure 7:
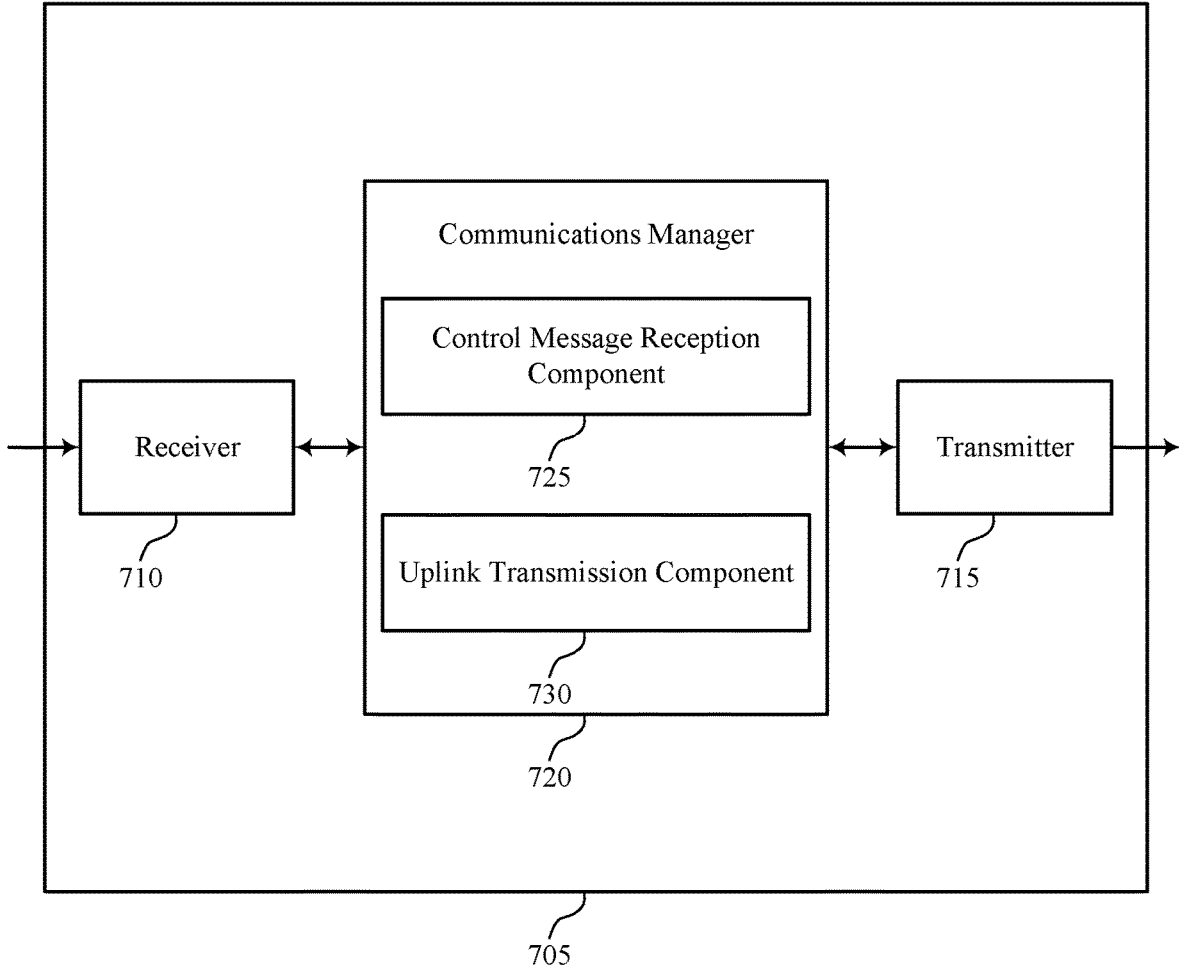

FIG. 7 shows a block diagram 700 of a device 705 that supports rules for dropping overlapping uplink shared channel messages in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to rules for dropping overlapping uplink shared channel messages). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to rules for dropping overlapping uplink shared channel messages). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of rules for dropping overlapping uplink shared channel messages as described herein. For example, the communications manager 720 may include a control message reception component 725 an uplink transmission component 730, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The communications manager 720 may support wireless communications in accordance with examples as disclosed herein. The control message reception component 725 may be configured as or otherwise support a means for receiving a first control message indicating a set of first PUSCH messages that have a first periodicity, the set of first PUSCH messages including a first PUSCH message associated with a first rank value and a first quantity of ports. The control message reception component 725 may be configured as or otherwise support a means for receiving a second control message indicating a second PUSCH message that is associated with a second rank value and a second quantity of ports, where the second PUSCH message overlaps at least partially in a time domain with the first PUSCH message. The uplink transmission component 730 may be configured as or otherwise support a means for transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

Figure 8:
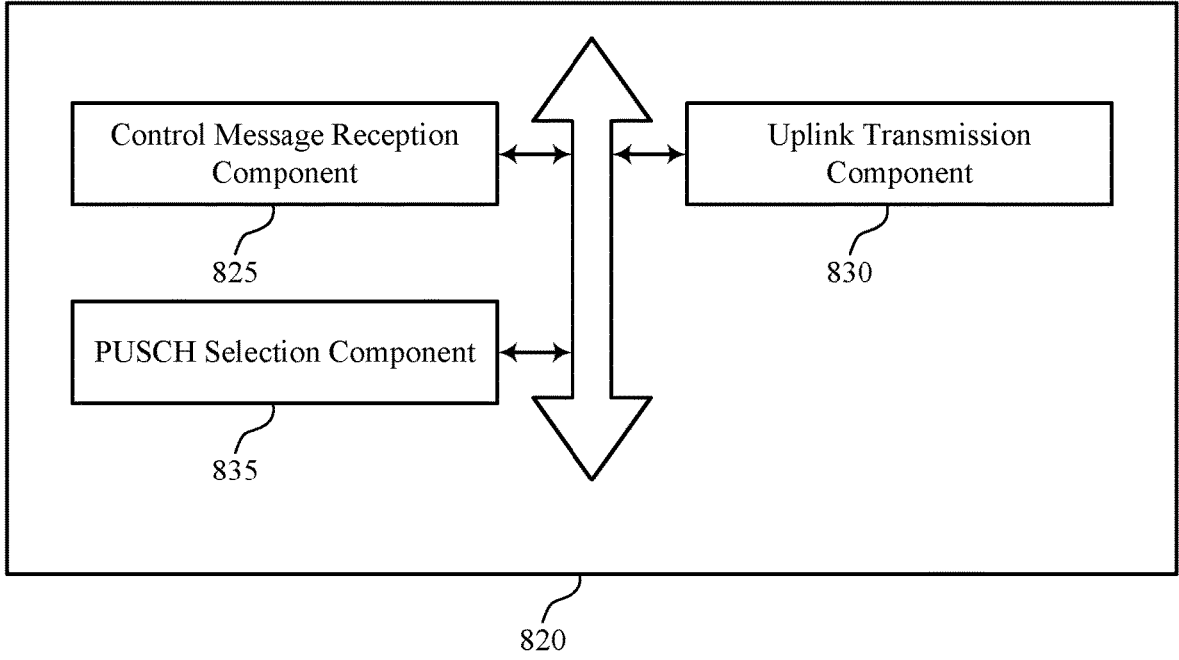
FIG. 8 shows a block diagram of a communications manager that supports rules for dropping overlapping uplink shared channel messages in accordance with one or more aspects of the present disclosure.

FIG. 8 shows a block diagram 800 of a communications manager 820 that supports rules for dropping overlapping uplink shared channel messages in accordance with one or more aspects of the present disclosure. The communications manager 820 may be an example of aspects of a communications manager 620, a communications manager 720, or both, as described herein. The communications manager 820, or various components thereof, may be an example of means for performing various aspects of rules for dropping overlapping uplink shared channel messages as described herein. For example, the communications manager 820 may include a control message reception component 825, an uplink transmission component 830, a PUSCH selection component 835, or any combination thereof. Each of these components may communicate, directly or indirectly, with one another (e.g., via one or more buses).

The communications manager 820 may support wireless communications in accordance with examples as disclosed herein. The control message reception component 825 may be configured as or otherwise support a means for receiving a first control message indicating a set of first PUSCH messages that have a first periodicity, the set of first PUSCH messages including a first PUSCH message associated with a first rank value and a first quantity of ports. In some examples, the control message reception component 825 may be configured as or otherwise support a means for receiving a second control message indicating a second PUSCH message that is associated with a second rank value and a second quantity of ports, where the second PUSCH message overlaps at least partially in a time domain with the first PUSCH message. The uplink transmission component 830 may be configured as or otherwise support a means for transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

In some examples, to support transmitting the first PUSCH message, the second PUSCH message, or both, the uplink transmission component 830 may be configured as or otherwise support a means for transmitting the first PUSCH message and refraining from transmitting the second PUSCH message based on the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples, transmitting the first PUSCH message and refraining from transmitting the second PUSCH message is based on a CORESET index associated with the second PUSCH message, an SRS resource set associated with the second PUSCH message, or both. Additionally, in some examples the UE refrains from transmitting PUSCH messages associated with the CORESET index or the SRS resource set when: one or more control messages indicate that PUSCH messages overlap in the time domain; and one or more rank values associated with the PUSCH messages that overlap in the time domain satisfy the threshold rank value or one or more quantities of ports associated with the PUSCH messages that overlap in the time domain satisfy the threshold quantity of ports.

In some examples, transmitting the first PUSCH message and refraining from transmitting the second PUSCH message is based on a first priority associated with the first PUSCH message being greater than a second priority associated with the second PUSCH message.

In some examples, transmitting the first PUSCH message and refraining from transmitting the second PUSCH message is based on a first starting position of the first PUSCH message being prior to a second starting position of the second PUSCH message.

In some examples, the second control message indicates a set of second PUSCH messages including the second PUSCH message where the set of second PUSCH messages have a second periodicity. Additionally, transmitting the first PUSCH message and refraining from transmitting the second PUSCH message may be based on the UE refraining from transmitting the second PUSCH message from the set of second PUSCH messages when: the second PUSCH message overlaps in the time domain with another PUSCH message; and one or more rank values associated with PUSCH messages that overlap in the time domain satisfies the threshold rank value or one or more quantities of ports associated with the PUSCH messages that overlap in the time domain satisfies the threshold quantity of ports.

In some examples, the UE refrains from transmitting the second PUSCH message from the set of second PUSCH messages based on a second CG configuration index associated with the set of second PUSCH messages being greater than a first CG configuration index associated with the set of first PUSCH messages or the second CG configuration index being less than the first CG configuration index.

In some examples, the UE refrains from transmitting PUSCH messages from the set of second PUSCH messages based on the second periodicity of the set of second PUSCH messages being greater than the first periodicity of the set of first PUSCH messages or the second periodicity of the set of second PUSCH messages being less than the first periodicity of the set of first PUSCH messages.

In some examples, transmitting the first PUSCH message and refraining from transmitting the second PUSCH message is based on a first comparison between a first MCS associated with the first PUSCH message and a second MCS associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

In some examples, the threshold rank value associated with PUSCH transmissions that overlap in the time domain include a first threshold rank value associated with the set of first PUSCH messages and a second threshold rank value associated with the second PUSCH message. Additionally, transmitting the first PUSCH message and refraining from transmitting the second PUSCH message may be based on the first rank value associated with the set of first PUSCH messages being less than or equal to the first threshold rank value or the second rank value associated with the second PUSCH message being greater than the second threshold rank value.

In some examples, the threshold quantity of ports associated with PUSCH transmissions that overlap in the time domain include a first threshold quantity of ports associated with the set of first PUSCH messages and a second threshold quantity of ports associated with the second PUSCH message. Additionally, transmitting the first PUSCH message and refraining from transmitting the second PUSCH message may be based on the first quantity of ports associated with the set of first PUSCH messages being less than or equal to the first threshold quantity of ports or the second quantity of ports associated with the second PUSCH message being greater than the second threshold quantity of ports.

In some examples, the first control message indicates that the set of first PUSCH messages are CG-PUSCH messages, receiving the second control message further includes receiving downlink control information indicating that the second PUSCH message is a DG-PUSCH message, and to support transmitting the first PUSCH message, the second PUSCH message, or both, the uplink transmission component 830 may be configured as or otherwise support a means for refraining from transmitting the first PUSCH message and transmitting the second PUSCH message based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples, refraining from transmitting the first PUSCH message and transmitting the second PUSCH message is based on the first PUSCH message being a CG-PUSCH message and the second PUSCH message being the DG-PUSCH message.

In some examples, the first control message indicates a first set of multiple PUSCH messages including at least the first PUSCH message that overlap at least partially in the time domain. In some examples, the second control message indicates a second set of multiple PUSCH messages including at least the second PUSCH message that overlap at least partially in the time domain.

In some examples, the PUSCH selection component 835 may be configured as or otherwise support a means for selecting the first PUSCH message from the first set of multiple PUSCH messages and the second PUSCH message from the second set of multiple PUSCH messages based on: the first PUSCH message being associated with a higher priority than remaining PUSCH messages in the first set of multiple PUSCH messages; the second PUSCH message being associated with a higher priority than remaining PUSCH messages in the second set of multiple PUSCH messages; the first rank value, the second rank value, or the sum of the first rank value and the second rank value being less than or equal to the threshold rank value; the first quantity of ports, the second quantity of ports, or the sum of the first quantity of ports and the second quantity of ports being less than or equal to the threshold quantity of ports; or a combination thereof, where transmitting the first PUSCH message, the second PUSCH message, or both is based on selecting the first PUSCH message and the second PUSCH message.

In some examples, the threshold rank value associated with PUSCH transmissions that overlap in the time domain corresponds to an aggregate threshold rank value the UE is capable of supporting for PUSCH transmissions that overlap in the time domain; and transmitting the first PUSCH message, the second PUSCH message, or both is based on whether the sum of the first rank value and the second rank value satisfies the threshold rank value.

In some examples, the threshold rank value associated with PUSCH transmissions that overlap in the time domain includes a first threshold rank value associated with the set of first PUSCH messages and a second threshold rank value associated with the second PUSCH message; and transmitting the first PUSCH message, the second PUSCH message, or both is based on whether the first rank value satisfies the first threshold rank value or the second rank value satisfies the second threshold rank value.

In some examples, the threshold quantity of ports associated with PUSCH transmissions that overlap in the time domain corresponds to an aggregate threshold quantity of ports the UE is capable of supporting for PUSCH transmissions that overlap in the time domain; and transmitting the first PUSCH message, the second PUSCH message, or both is based on whether the sum of the first quantity of ports and the second quantity of ports satisfies the threshold quantity of ports.

In some examples, the threshold quantity of ports associated with PUSCH transmissions that overlap in the time domain corresponds to a first threshold quantity of ports associated with the set of first PUSCH messages and a second threshold quantity of ports associated with the second PUSCH message; and transmitting the first PUSCH message, the second PUSCH message, or both is based on whether the first quantity of ports satisfies the first threshold quantity of ports or the second quantity of ports satisfies the second threshold quantity of ports.

In some examples, to support transmitting the first PUSCH message, the second PUSCH message, or both, the uplink transmission component 830 may be configured as or otherwise support a means for transmitting the first PUSCH message and the second PUSCH message based on: the first rank value, the second rank value, or the sum of the first rank value and the second rank value being less than or equal to the threshold rank value; and the first quantity of ports, the second quantity of ports, or the sum of the first quantity of ports and the second quantity of ports being less than or equal to the threshold quantity of ports.

Figure 9:
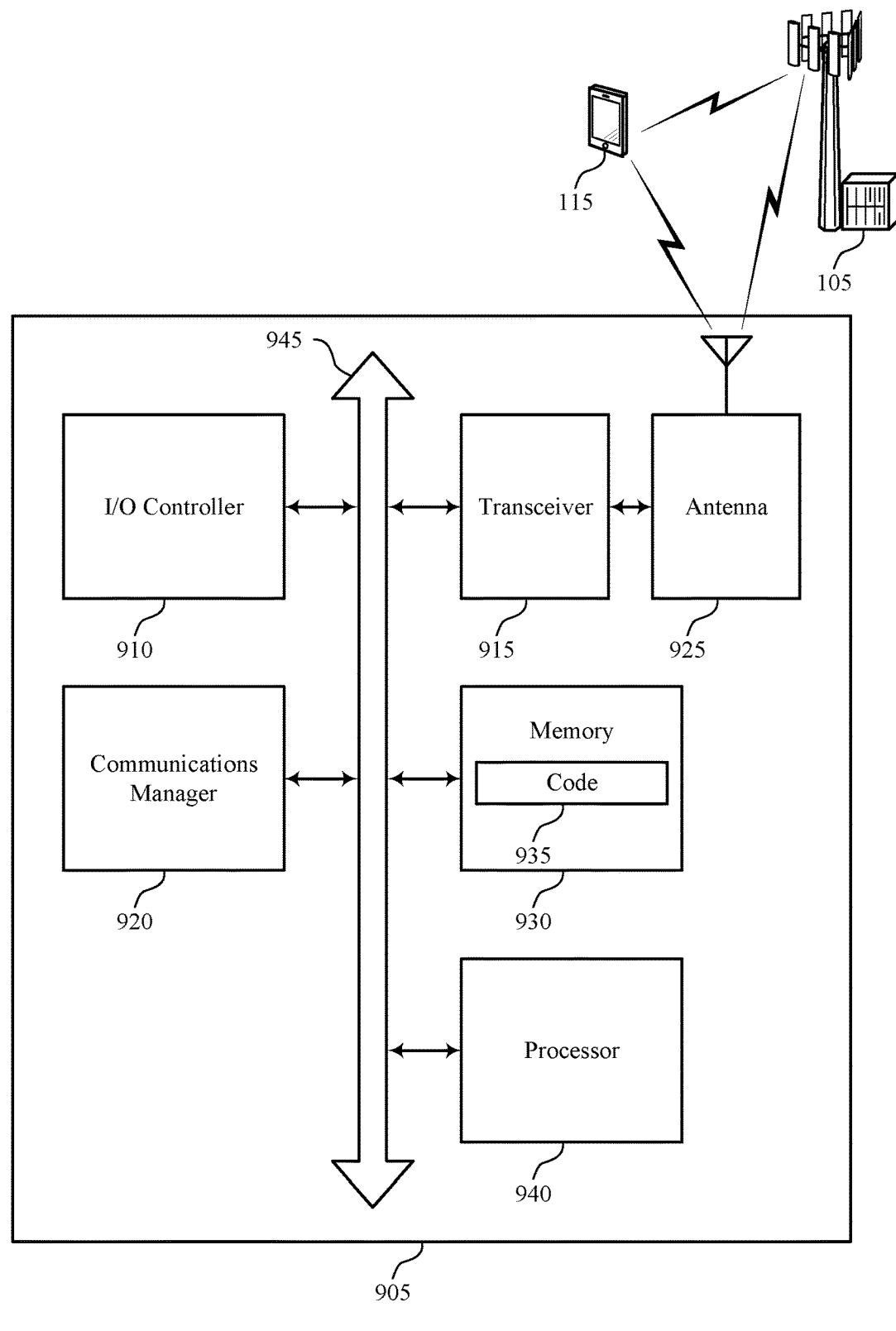
FIG. 9 shows a diagram of a system including a device that supports rules for dropping overlapping uplink shared channel messages in accordance with one or more aspects of the present disclosure.

FIG. 9 shows a diagram of a system 900 including a device 905 that supports rules for dropping overlapping uplink shared channel messages in accordance with one or more aspects of the present disclosure. The device 905 may be an example of or include the components of a device 605, a device 705, or a UE 115 as described herein. The device 905 may communicate (e.g., wirelessly) with one or more network entities 105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting rules for dropping overlapping uplink shared channel messages). For example, the device 905 or a component of the device 905 may include a processor 940 and memory 930 coupled with or to the processor 940, the processor 940 and memory 930 configured to perform various functions described herein.

The communications manager 920 may support wireless communications in accordance with examples as disclosed herein. For example, the communications manager 920 may be configured as or otherwise support a means for receiving a first control message indicating a set of first PUSCH messages that have a first periodicity, the set of first PUSCH messages including a first PUSCH message associated with a first rank value and a first quantity of ports. The communications manager 920 may be configured as or otherwise support a means for receiving a second control message indicating a second PUSCH message that is associated with a second rank value and a second quantity of ports, where the second PUSCH message overlaps at least partially in a time domain with the first PUSCH message. The communications manager 920 may be configured as or otherwise support a means for transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

By including or configuring the communications manager 920 in accordance with examples as described herein, the device 905 may support techniques for reduced latency, reduced power consumption, longer battery life, and improved utilization of processing capability. The device 905 may avoid increased latency that may be a result of supports rules for dropping overlapping uplink shared channel messages and refraining from transmitting uplink shared channel messages that may overlap in time and exceed UE capabilities. The device 905 may thereby be configured with dropping rules that may permit some potential interference to better enable the device 905 to perform transmission.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of rules for dropping overlapping uplink shared channel messages as described herein, or the processor 940 and the memory 930 may be otherwise configured to perform or support such operations.

Figure 10:
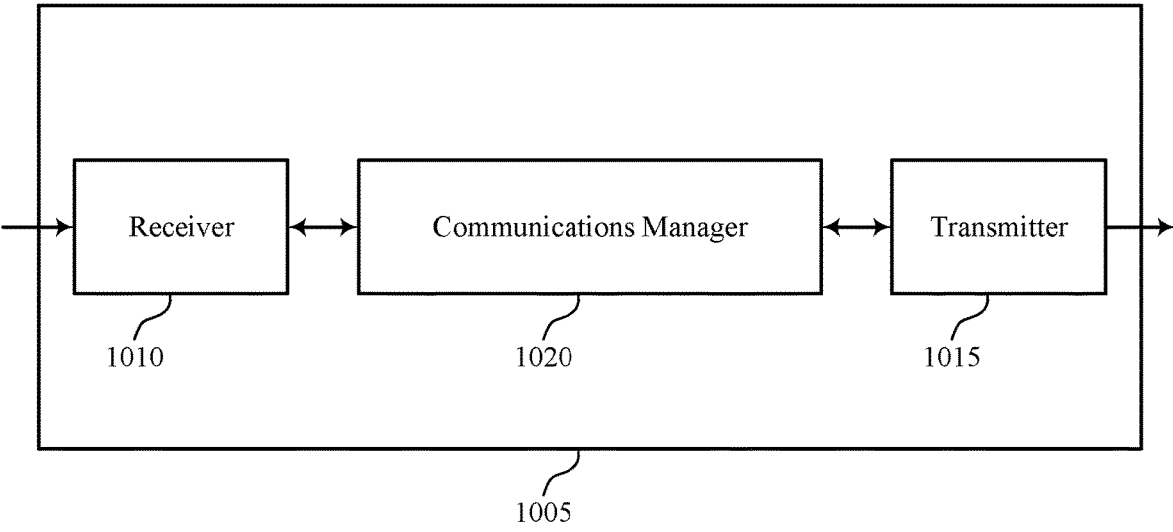
FIGS. 10 and 11 show block diagrams of devices that support rules for dropping overlapping uplink shared channel messages in accordance with one or more aspects of the present disclosure.

FIG. 10 shows a block diagram 1000 of a device 1005 that supports rules for dropping overlapping uplink shared channel messages in accordance with one or more aspects of the present disclosure. The device 1005 may be an example of aspects of a network entity 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of rules for dropping overlapping uplink shared channel messages as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, a CPU, an ASIC, an FPGA or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

The communications manager 1020 may support wireless communications at a network entity in accordance with examples as disclosed herein. For example, the communications manager 1020 may be configured as or otherwise support a means for transmitting, to a UE, a first control message indicating a set of first PUSCH messages that have a first periodicity, the set of first PUSCH messages including a first PUSCH message associated with a first rank value and a first quantity of ports. The communications manager 1020 may be configured as or otherwise support a means for transmitting, to the UE, a second control message indicating a second PUSCH message that is associated with a second rank value and a second quantity of ports, where the second PUSCH message overlaps at least partially in a time domain with the first PUSCH message. The communications manager 1020 may be configured as or otherwise support a means for receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

By including or configuring the communications manager 1020 in accordance with examples as described herein, the device 1005 (e.g., a processor controlling or otherwise coupled with the receiver 1010, the transmitter 1015, the communications manager 1020, or a combination thereof) may support techniques for reduced processing and reduced power consumption. For example, by dropping overlapping uplink shared channel messages, the processor of the device 1005 may refrain from processing (e.g., performing transmissions) on the wireless channel.

Figure 11:
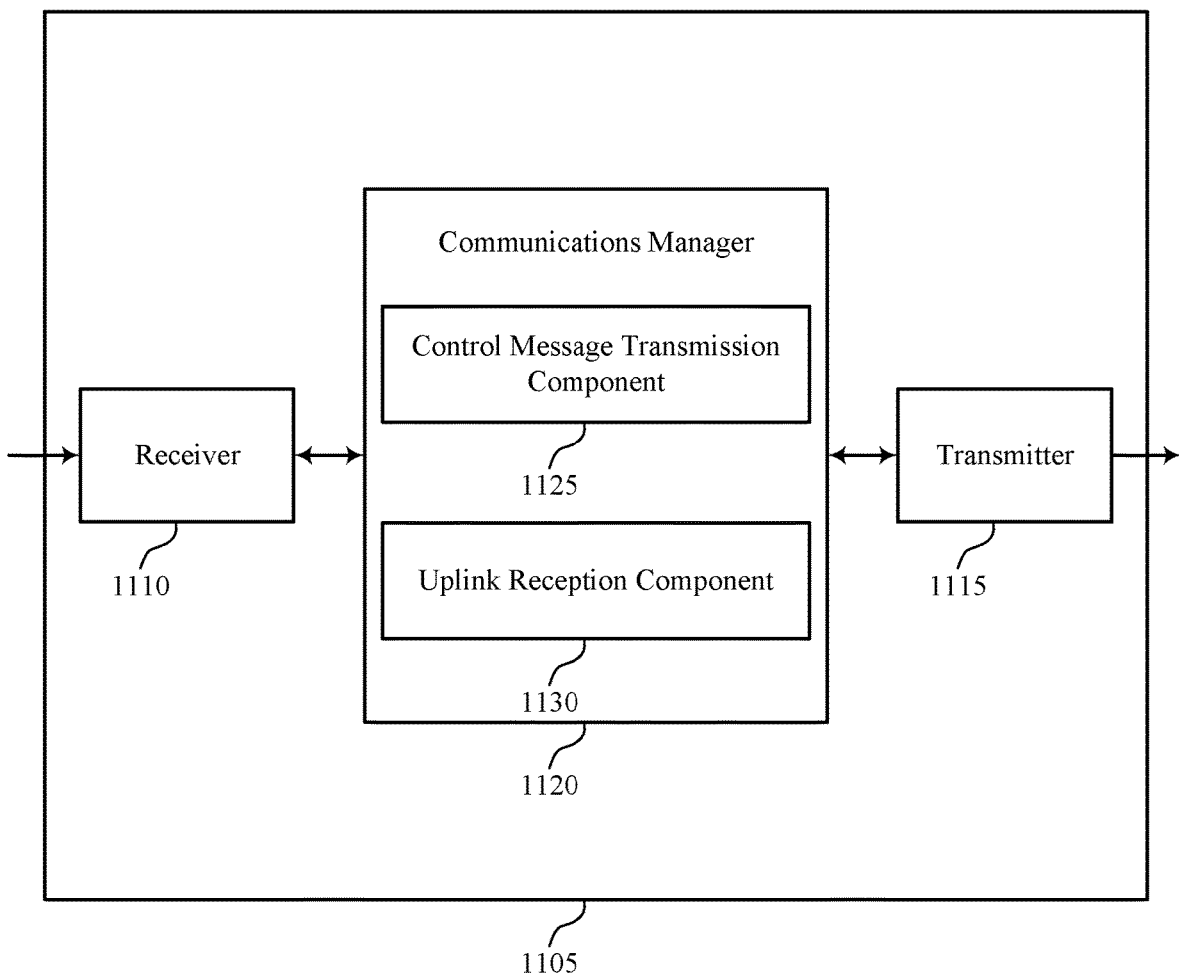

FIG. 11 shows a block diagram 1100 of a device 1105 that supports rules for dropping overlapping uplink shared channel messages in accordance with one or more aspects of the present disclosure. The device 1105 may be an example of aspects of a device 1005 or a network entity 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of rules for dropping overlapping uplink shared channel messages as described herein. For example, the communications manager 1120 may include a control message transmission component 1125 an uplink reception component 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The communications manager 1120 may support wireless communications at a network entity in accordance with examples as disclosed herein. The control message transmission component 1125 may be configured as or otherwise support a means for transmitting, to a UE, a first control message indicating a set of first PUSCH messages that have a first periodicity, the set of first PUSCH messages including a first PUSCH message associated with a first rank value and a first quantity of ports. The control message reception component 1125 may be configured as or otherwise support a means for transmitting, to the UE, a second control message indicating a second PUSCH message that is associated with a second rank value and a second quantity of ports, where the second PUSCH message overlaps at least partially in a time domain with the first PUSCH message. The uplink reception component 1130 may be configured as or otherwise support a means for receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

Figure 12:
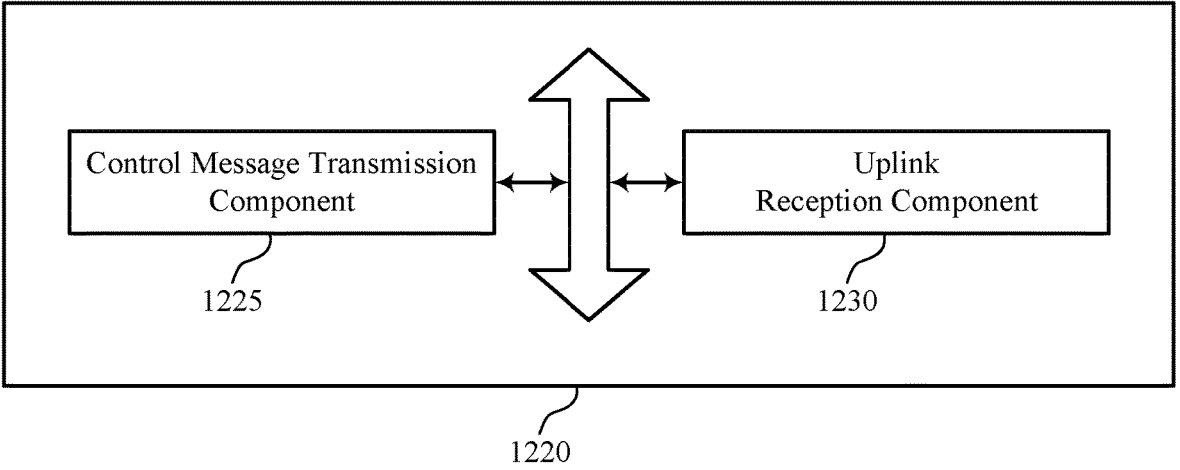
FIG. 12 shows a block diagram of a communications manager that supports rules for dropping overlapping uplink shared channel messages in accordance with one or more aspects of the present disclosure.
Figure 12:
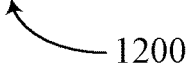

FIG. 12 shows a block diagram 1200 of a communications manager 1220 that supports rules for dropping overlapping uplink shared channel messages in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of rules for dropping overlapping uplink shared channel messages as described herein. For example, the communications manager 1220 may include a control message transmission component 1225, an uplink reception component 1230, or any combination thereof. Each of these components may communicate, directly or indirectly, with one another (e.g., via one or more buses) which may include communications within a protocol layer of a protocol stack, communications associated with a logical channel of a protocol stack (e.g., between protocol layers of a protocol stack, within a device, component, or virtualized component associated with a network entity 105, between devices, components, or virtualized components associated with a network entity 105), or any combination thereof.

The communications manager 1220 may support wireless communications at a network entity in accordance with examples as disclosed herein. The control message transmission component 1225 may be configured as or otherwise support a means for transmitting, to a UE, a first control message indicating a set of first PUSCH messages that have a first periodicity, the set of first PUSCH messages including a first PUSCH message associated with a first rank value and a first quantity of ports. In some examples, the control message transmission component 1225 may be configured as or otherwise support a means for transmitting, to the UE, a second control message indicating a second PUSCH message that is associated with a second rank value and a second quantity of ports, where the second PUSCH message overlaps at least partially in a time domain with the first PUSCH message. The uplink reception component 1230 may be configured as or otherwise support a means for receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

In some examples, to support receiving the first PUSCH message, the second PUSCH message, or both, the uplink reception component 1230 may be configured as or otherwise support a means for receiving the first PUSCH message and failing to detect the second PUSCH message based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples, receiving the first PUSCH message and failing to detect the second PUSCH message is based on a CORESET index associated with the second PUSCH message, an SRS resource set associated with the second PUSCH message, or both.

In some examples, receiving the first PUSCH message and failing to detect the second PUSCH message is based on a first priority associated with the first PUSCH message being greater than a second priority associated with the second PUSCH message.

In some examples, receiving the first PUSCH message and failing to detect the second PUSCH message is based on a first starting position of the first PUSCH message being prior to a second starting position of the second PUSCH message.

In some examples, the second control message indicates a set of second PUSCH messages including the second PUSCH message, the set of second PUSCH messages having a second periodicity.

In some examples, receiving the first PUSCH message and failing to detect the second PUSCH message is based on a second CG configuration index associated with the set of second PUSCH messages being greater than a first CG configuration index associated with the set of first PUSCH messages or the second CG configuration index being less than the first CG configuration index.

In some examples, receiving the first PUSCH message and failing to detect the second PUSCH message is based on the second periodicity of the set of second PUSCH messages being greater than the first periodicity of the set of first PUSCH messages or the second periodicity of the set of second PUSCH messages being less than the first periodicity of the set of first PUSCH messages.

In some examples, receiving the first PUSCH message and failing to detect the second PUSCH message is based on a first comparison between a first MCS associated with the first PUSCH message and a second MCS associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

In some examples, the threshold rank value associated with PUSCH transmissions that overlap in the time domain include a first threshold rank value associated with the first set of PUSCH messages and a second threshold rank value associated with the second PUSCH message, and receiving the first PUSCH message and failing to detect the second PUSCH message is based on the first rank value associated with the set of first PUSCH messages being less than or equal to the first threshold rank value and the second rank value associated with the second PUSCH message being greater than the second threshold rank value.

In some examples, the threshold quantity of ports associated with PUSCH transmissions that overlap in the time domain include a first threshold quantity of ports associated with the set of first PUSCH messages and a second threshold quantity of ports associated with the second PUSCH message and receiving the first PUSCH message and failing to detect the second PUSCH message is based on the first quantity of ports associated with the set of first PUSCH messages being less than or equal to the first threshold quantity of ports and the second quantity of ports associated with the second PUSCH message being greater than the second threshold quantity of ports.

In some examples, the first control message indicates that the set of first PUSCH messages are CG-PUSCH messages, to support transmitting the second control message the control message transmission component 1225 may be configured as or otherwise support a means for transmitting DCI indicating that the second PUSCH message is a DG-PUSCH message, and to support receiving the first PUSCH message, receiving the second PUSCH message, or both, the uplink reception component 1230 may be configured as or otherwise support a means for failing to detect the first PUSCH message and receiving the second PUSCH message based on: the first rank value, the second rank value, or the sum of the first rank value and the second rank value satisfying the threshold rank value; or the first quantity of ports, the second quantity of ports, or the sum of the first quantity of ports and the second quantity of ports satisfying the threshold quantity of ports.

In some examples, failing to detect the first PUSCH message and receiving the second PUSCH message is based on the first PUSCH message being a CG-PUSCH message and the second PUSCH message being the DG-PUSCH message.

In some examples, the first control message indicates a first set of multiple PUSCH messages including at least the first PUSCH message that overlap at least partially in the time domain, and the second control message indicates a second set of multiple PUSCH messages including at least the second PUSCH message that overlap at least partially in the time domain.

In some examples, the uplink reception component 1230 may be configured as or otherwise support a means for receiving the first PUSCH message from the first set of PUSCH messages and the second PUSCH message from the second set of PUSCH messages based on: the first PUSCH message being associated with a higher priority than remaining PUSCH messages in the first set of multiple PUSCH messages; the second PUSCH message being associated with a higher priority than remaining PUSCH messages in the second set of multiple PUSCH messages; the first rank value, the second rank value, or the sum of the first rank value and the second rank value being less than or equal to the threshold rank value; the first quantity of ports, the second quantity of ports, or the sum of the first quantity of ports and the second quantity of ports being less than or equal to the threshold quantity of ports, or a combination thereof.

In some examples, the threshold rank value associated with PUSCH transmissions that overlap in the time domain corresponds to an aggregate threshold rank value the UE is capable of supporting for PUSCH transmissions that overlap in the time domain, and receiving the first PUSCH message, the second PUSCH message, or both is based on whether the sum of the first rank value and the second rank value satisfies the threshold rank value.

In some examples, the threshold rank value associated with PUSCH transmissions that overlap in the time domain includes a first threshold rank value associated with the set of first PUSCH messages and a second threshold rank value associated with the second PUSCH message, and receiving the first PUSCH message, the second PUSCH message, or both is based on whether the first rank value satisfies the first threshold rank value or the second rank value satisfies the second threshold rank value.

In some examples, the threshold quantity of ports associated with PUSCH transmissions that overlap in the time domain corresponds to an aggregate threshold quantity of ports the UE is capable of supporting for PUSCH transmissions that overlap in the time domain, and receiving the first PUSCH message, the second PUSCH message, or both is based on whether the sum of the first quantity of ports and the second quantity of ports satisfies the threshold quantity of ports.

In some examples, the threshold quantity of ports associated with PUSCH transmissions that overlap in the time domain corresponds to a first threshold quantity of ports associated with the set of first PUSCH messages and a second threshold quantity of ports associated with the second PUSCH message, and receiving the first PUSCH message, the second PUSCH message, or both is based on whether the first quantity of ports satisfies the first threshold quantity of ports or the second quantity of ports satisfies the second threshold quantity of ports.

In some examples, to support receiving the first PUSCH message, the second PUSCH message, or both, the uplink reception component 1230 may be configured as or otherwise support a means for receiving the first PUSCH message and the second PUSCH message based on: the first rank value, the second rank value, or the sum of the first rank value and the second rank value being less than or equal to the threshold rank value, and the first quantity of ports, the second quantity of ports, or the sum of the first quantity of ports and the second quantity of ports being less than or equal to the threshold quantity of ports.

Figure 13:
FIG. 13 shows a diagram of a system including a device that supports rules for dropping overlapping uplink shared channel messages in accordance with one or more aspects of the present disclosure.

FIG. 13 shows a diagram of a system 1300 including a device 1305 that supports rules for dropping overlapping uplink shared channel messages in accordance with one or more aspects of the present disclosure. The device 1305 may be an example of or include the components of a device 1005, a device 1105, or a network entity 105 as described herein. The device 1305 may communicate with one or more network entities 105, one or more UEs 115, or any combination thereof, which may include communications over one or more wired interfaces, over one or more wireless interfaces, or any combination thereof. The device 1305 may include components that support outputting and obtaining communications, such as a communications manager 1320, a transceiver 1310, an antenna 1315, a memory 1325, code 1330, and a processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or memory components (for example, the processor 1335, or the memory 1325, or both), may be included in a chip or chip assembly that is installed in the device 1305. In some examples, the transceiver may be operable to support communications via one or more communications links (e.g., a communication link 125, a backhaul communication link 120, a midhaul communication link 162, a fronthaul communication link 168).

The memory 1325 may include RAM and ROM. The memory 1325 may store computer-readable, computer-executable code 1330 including instructions that, when executed by the processor 1335, cause the device 1305 to perform various functions described herein. The code 1330 may be stored in a non-transitory computer-readable medium such as system memory or another type of memory. In some cases, the code 1330 may not be directly executable by the processor 1335 but may cause a computer (e.g., when compiled and executed) to perform functions described herein. In some cases, the memory 1325 may contain, among other things, a BIOS which may control basic hardware or software operation such as the interaction with peripheral components or devices.

The processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the processor 1335 may be configured to operate a memory array using a memory controller. In some other cases, a memory controller may be integrated into the processor 1335. The processor 1335 may be configured to execute computer-readable instructions stored in a memory (e.g., the memory 1325) to cause the device 1305 to perform various functions (e.g., functions or tasks supporting rules for dropping overlapping uplink shared channel messages). For example, the device 1305 or a component of the device 1305 may include a processor 1335 and memory 1325 coupled with the processor 1335, the processor 1335 and memory 1325 configured to perform various functions described herein. The processor 1335 may be an example of a cloud-computing platform (e.g., one or more physical nodes and supporting software such as operating systems, virtual machines, or container instances) that may host the functions (e.g., by executing code 1330) to perform the functions of the device 1305. The processor 1335 may be any one or more suitable processors capable of executing scripts or instructions of one or more software programs stored in the device 1305 (such as within the memory 1325). In some implementations, the processor 1335 may be a component of a processing system. A processing system may generally refer to a system or series of machines or components that receives inputs and processes the inputs to produce a set of outputs (which may be passed to other systems or components of, for example, the device 1305). For example, a processing system of the device 1305 may refer to a system including the various other components or subcomponents of the device 1305, such as the processor 1335, or the transceiver 1310, or the communications manager 1320, or other components or combinations of components of the device 1305. The processing system of the device 1305 may interface with other components of the device 1305, and may process information received from other components (such as inputs or signals) or output information to other components. For example, a chip or modem of the device 1305 may include a processing system and one or more interfaces to output information, or to obtain information, or both. The one or more interfaces may be implemented as or otherwise include a first interface configured to output information and a second interface configured to obtain information, or a same interface configured to output information and to obtain information, among other implementations. In some implementations, the one or more interfaces may refer to an interface between the processing system of the chip or modem and a transmitter, such that the device 1305 may transmit information output from the chip or modem. Additionally, or alternatively, in some implementations, the one or more interfaces may refer to an interface between the processing system of the chip or modem and a receiver, such that the device 1305 may obtain information or signal inputs, and the information may be passed to the processing system. A person having ordinary skill in the art will readily recognize that a first interface also may obtain information or signal inputs, and a second interface also may output information or signal outputs.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the memory 1325, the code 1330, and the processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

The communications manager 1320 may support wireless communications at a network entity in accordance with examples as disclosed herein. For example, the communications manager 1320 may be configured as or otherwise support a means for transmitting, to a UE, a first control message indicating a set of first PUSCH messages that have a first periodicity, the set of first PUSCH messages including a first PUSCH message associated with a first rank value and a first quantity of ports. The communications manager 1320 may be configured as or otherwise support a means for transmitting, to the UE, a second control message indicating a second PUSCH message that is associated with a second rank value and a second quantity of ports, where the second PUSCH message overlaps at least partially in a time domain with the first PUSCH message. The communications manager 1320 may be configured as or otherwise support a means for receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain.

By including or configuring the communications manager 1320 in accordance with examples as described herein, the device 1305 may support techniques for reduced latency, reduced power consumption, longer battery life, and improved utilization of processing capability. The device 1305 may avoid increased latency that may be a result of transmitting overlapping uplink shared channel messages and exceeding UE capabilities. The device 1305 may thereby be configured with dropping that may permit some potential interference to better enable the device 1305 to perform transmissions.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, the processor 1335, the memory 1325, the code 1330, or any combination thereof. For example, the code 1330 may include instructions executable by the processor 1335 to cause the device 1305 to perform various aspects of rules for dropping overlapping uplink shared channel messages as described herein, or the processor 1335 and the memory 1325 may be otherwise configured to perform or support such operations.

FIG. 14 shows a flowchart illustrating a method 1400 that supports rules for dropping overlapping uplink shared channel messages in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving a first control message indicating a set of first PUSCH messages that have a first periodicity, the set of first PUSCH messages including a first PUSCH message associated with a first rank value and a first quantity of ports. The operations of 1405 may be performed in accordance with examples as disclosed herein. In some examples, aspects of the operations of 1405 may be performed by a control message reception component 825 as described with reference to FIG. 8.

At 1410, the method may include receiving a second control message indicating a second PUSCH message that is associated with a second rank value and a second quantity of ports, where the second PUSCH message overlaps at least partially in a time domain with the first PUSCH message. The operations of 1410 may be performed in accordance with examples as disclosed herein. In some examples, aspects of the operations of 1410 may be performed by a control message reception component 825 as described with reference to FIG. 8.

At 1415, the method may include transmitting the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain. The operations of 1415 may be performed in accordance with examples as disclosed herein. In some examples, aspects of the operations of 1415 may be performed by an uplink transmission component 830 as described with reference to FIG. 8.

FIG. 15 shows a flowchart illustrating a method 1500 that supports rules for dropping overlapping uplink shared channel messages in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving a first control message indicating a set of first PUSCH messages that have a first periodicity, the set of first PUSCH messages including a first PUSCH message associated with a first rank value and a first quantity of ports. The operations of 1505 may be performed in accordance with examples as disclosed herein. In some examples, aspects of the operations of 1505 may be performed by a control message reception component 825 as described with reference to FIG. 8.

At 1510, the method may include receiving a second control message indicating a second PUSCH message that is associated with a second rank value and a second quantity of ports, where the second PUSCH message overlaps at least partially in a time domain with the first PUSCH message. The operations of 1510 may be performed in accordance with examples as disclosed herein. In some examples, aspects of the operations of 1510 may be performed by a control message reception component 825 as described with reference to FIG. 8.

At 1515, the method may include transmitting the first PUSCH message. The operations of 1515 may be performed in accordance with examples as disclosed herein. In some examples, aspects of the operations of 1515 may be performed by an uplink transmission component 830 as described with reference to FIG. 8.

At 1520, the method may include refraining from transmitting the second PUSCH message based on: the first rank value, the second rank value, or a sum of the first rank value and the second rank value satisfying the threshold rank value associated with PUSCH transmissions that overlap in the time domain; or the first quantity of ports, the second quantity of ports, or a sum of the first quantity of ports and the second quantity of ports satisfying a threshold quantity of ports associated with PUSCH transmissions that overlap in the time domain. The operations of 1520 may be performed in accordance with examples as disclosed herein. In some examples, aspects of the operations of 1520 may be performed by an uplink transmission component 830 as described with reference to FIG. 8.

FIG. 16 shows a flowchart illustrating a method 1600 that supports rules for dropping overlapping uplink shared channel messages in accordance with one or more aspects of the present disclosure. The operations of the method 1600 may be implemented by a network entity or its components as described herein. For example, the operations of the method 1600 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1605, the method may include transmitting, to a UE, a first control message indicating a set of first PUSCH messages that have a first periodicity, the set of first PUSCH messages including a first PUSCH message associated with a first rank value and a first quantity of ports. The operations of 1605 may be performed in accordance with examples as disclosed herein. In some examples, aspects of the operations of 1605 may be performed by a control message transmission component 1225 as described with reference to FIG. 12.

At 1610, the method may include transmitting, to the UE, a second control message indicating a second PUSCH message that is associated with a second rank value and a second quantity of ports, where the second PUSCH message overlaps at least partially in a time domain with the first PUSCH message. The operations of 1610 may be performed in accordance with examples as disclosed herein. In some examples, aspects of the operations of 1610 may be performed by a control message transmission component 1225 as described with reference to FIG. 12.

At 1615, the method may include receiving, from the UE, the first PUSCH message, the second PUSCH message, or both based on whether: the first rank value, the second rank value, or a sum of the first rank value and the second rank value satisfies a threshold rank value associated with PUSCH transmissions that overlap in the time domain; or the first quantity of ports, the second quantity of ports, or a sum of the first quantity of ports and the second quantity of ports satisfies a threshold quantity of ports associated with PUSCH transmissions that overlap in the time domain. The operations of 1615 may be performed in accordance with examples as disclosed herein. In some examples, aspects of the operations of 1615 may be performed by an uplink reception component 1230 as described with reference to FIG. 12.

FIG. 17 shows a flowchart illustrating a method 1700 that supports rules for dropping overlapping uplink shared channel messages in accordance with one or more aspects of the present disclosure. The operations of the method 1700 may be implemented by a network entity or its components as described herein. For example, the operations of the method 1700 may be performed by a network entity as described with reference to FIGS. 1 through 5 and 10 through 13. In some examples, a network entity may execute a set of instructions to control the functional elements of the network entity to perform the described functions. Additionally, or alternatively, the network entity may perform aspects of the described functions using special-purpose hardware.

At 1705, the method may include transmitting, to a UE, a first control message indicating a set of first PUSCH messages that have a first periodicity, the set of first PUSCH messages including a first PUSCH message associated with a first rank value and a first quantity of ports. The operations of 1705 may be performed in accordance with examples as disclosed herein. In some examples, aspects of the operations of 1705 may be performed by a control message transmission component 1225 as described with reference to FIG. 12.

At 1710, the method may include transmitting, to the UE, a second control message indicating a second PUSCH message that is associated with a second rank value and a second quantity of ports, where the second PUSCH message overlaps at least partially in a time domain with the first PUSCH message. The operations of 1710 may be performed in accordance with examples as disclosed herein. In some examples, aspects of the operations of 1710 may be performed by a control message transmission component 1225 as described with reference to FIG. 12.

At 1715, the method may include receiving the first PUSCH message. The operations of 1715 may be performed in accordance with examples as disclosed herein. In some examples, aspects of the operations of 1715 may be performed by an uplink reception component 1230 as described with reference to FIG. 12.

At 1720, the method may include failing to detect the second PUSCH message based on the first rank value, the second rank value, or a sum of the first rank value and the second rank value satisfying a threshold rank value associated with PUSCH transmissions that overlap in the time domain; or the first quantity of ports, the second quantity of ports, or a sum of the first quantity of ports and the second quantity of ports satisfying a threshold quantity of ports associated with PUSCH transmissions that overlap in the time domain. The operations of 1720 may be performed in accordance with examples as disclosed herein. In some examples, aspects of the operations of 1720 may be performed by an uplink reception component 1230 as described with reference to FIG. 12.

The following provides an overview of aspects of the present disclosure:

Aspect 1: A method for wireless communications, comprising: receiving a first control message indicating a set of first PUSCH messages that have a first periodicity, the set of first PUSCH messages including a first PUSCH message associated with a first rank value and a first quantity of ports; receiving a second control message indicating a second PUSCH message that is associated with a second rank value and a second quantity of ports, wherein the second PUSCH message overlaps at least partially in a time domain with the first PUSCH message; and transmitting the first PUSCH message, the second PUSCH message, or both based at least in part on whether: the first rank value, the second rank value, or a sum of the first rank value and the second rank value satisfies a threshold rank value associated with PUSCH transmissions that overlap in the time domain, or the first quantity of ports, the second quantity of ports, or a sum of the first quantity of ports and the second quantity of ports satisfies a threshold quantity of ports associated with PUSCH transmissions that overlap in the time domain.

Aspect 2: The method of aspect 1, wherein transmitting the first PUSCH message, the second PUSCH message, or both further comprises: transmitting the first PUSCH message; and refraining from transmitting the second PUSCH message based at least in part on: the first rank value, the second rank value, or the sum of the first rank value and the second rank value satisfying the threshold rank value, or the first quantity of ports, the second quantity of ports, or the sum of the first quantity of ports and the second quantity of ports satisfying the threshold quantity of ports.

Aspect 3: The method of aspect 2, wherein transmitting the first PUSCH message and refraining from transmitting the second PUSCH message is based at least in part on a CORESET index associated with the second PUSCH message, an SRS resource set associated with the second PUSCH message, or both, and wherein the UE refrains from transmitting PUSCH messages associated with the CORESET index or the SRS resource set when one or more control messages indicate that PUSCH messages overlap in the time domain; and one or more rank values associated with the PUSCH messages that overlap in the time domain satisfy the threshold rank value or one or more quantities of ports associated with the PUSCH messages that overlap in the time domain satisfy the threshold quantity of ports.

Aspect 4: The method of aspect 2, wherein transmitting the first PUSCH message and refraining from transmitting the second PUSCH message is based at least in part on a first priority associated with the first PUSCH message being greater than a second priority associated with the second PUSCH message.

Aspect 5: The method of aspect 2, wherein transmitting the first PUSCH message and refraining from transmitting the second PUSCH message is based at least in part on a first starting position of the first PUSCH message being prior to a second starting position of the second PUSCH message.

Aspect 6: The method of any of aspects 2 through 5, wherein the second control message indicates a set of second PUSCH messages comprising the second PUSCH message, the set of second PUSCH messages having a second periodicity; and transmitting the first PUSCH message and refraining from transmitting the second PUSCH message is based at least in part on the UE refraining from transmitting the second PUSCH message from the set of second PUSCH messages when: the second PUSCH message overlaps in the time domain with another PUSCH message; and one or more rank values associated with PUSCH messages that overlap in the time domain satisfies the threshold rank value or one or more quantities of ports associated with the PUSCH messages that overlap in the time domain satisfies the threshold quantity of ports.

Aspect 7: The method of aspect 6, wherein the UE refrains from transmitting the second PUSCH message from the set of second PUSCH messages based at least in part on a second CG configuration index associated with the set of second PUSCH messages being greater than a first CG configuration index associated with the set of first PUSCH messages or the second CG configuration index being less than the first CG configuration index.

Aspect 8: The method of any of aspects 6 through 7, wherein the UE refrains from transmitting PUSCH messages from the set of second PUSCH messages based at least in part on the second periodicity of the set of second PUSCH messages being greater than the first periodicity of the set of first PUSCH messages or the second periodicity of the set of second PUSCH messages being less than the first periodicity of the set of first PUSCH messages.

Aspect 9: The method of aspect 2, wherein transmitting the first PUSCH message and refraining from transmitting the second PUSCH message is based at least in part on a first comparison between a first MCS associated with the first PUSCH message and a second MCS associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

Aspect 10: The method of aspect 2, wherein the threshold rank value associated with PUSCH transmissions that overlap in the time domain comprise a first threshold rank value associated with the set of first PUSCH messages and a second threshold rank value associated with the second PUSCH message; and transmitting the first PUSCH message and refraining from transmitting the second PUSCH message is based at least in part on: the first rank value associated with the set of first PUSCH messages being less than or equal to the first threshold rank value, and the second rank value associated with the second PUSCH message being greater than the second threshold rank value.

Aspect 11: The method of aspect 2, wherein the threshold quantity of ports associated with PUSCH transmissions that overlap in the time domain comprise a first threshold quantity of ports associated with the set of first PUSCH messages and a second threshold quantity of ports associated with the second PUSCH message; and transmitting the first PUSCH message and refraining from transmitting the second PUSCH message is based at least in part on: the first quantity of ports associated with the set of first PUSCH messages being less than or equal to the first threshold quantity of ports, and the second quantity of ports associated with the second PUSCH message being greater than the second threshold quantity of ports.

Aspect 12: The method of aspect 1, wherein the first control message indicates that the set of first PUSCH messages are (CG) PUSCH messages; receiving the second control message further comprises receiving DCI indicating that the second PUSCH message is a DG-PUSCH message; and transmitting the first PUSCH message, the second PUSCH message, or both further comprises refraining from transmitting the first PUSCH message and transmitting the second PUSCH message based at least in part on: the first rank value, the second rank value, or the sum of the first rank value and the second rank value satisfying the threshold rank value, or the first quantity of ports, the second quantity of ports, or the sum of the first quantity of ports and the second quantity of ports satisfying the threshold quantity of ports.

Aspect 13: The method of aspect 12, wherein refraining from transmitting the first PUSCH message and transmitting the second PUSCH message is based at least in part on the first PUSCH message being a CG-PUSCH message and the second PUSCH message being the DG-PUSCH message.

Aspect 14: The method of any of aspects 1 through 13, wherein the first control message indicates a first plurality of PUSCH messages comprising at least the first PUSCH message that overlap at least partially in the time domain; and the second control message indicates a second plurality of PUSCH messages comprising at least the second PUSCH message that overlap at least partially in the time domain.

Aspect 15: The method of aspect 14, further comprising: selecting the first PUSCH message from the first plurality of PUSCH messages and the second PUSCH message from the second plurality of PUSCH messages based at least in part on: the first PUSCH message being associated with a higher priority than remaining PUSCH messages in the first plurality of PUSCH messages, the second PUSCH message being associated with a higher priority than remaining PUSCH messages in the second plurality of PUSCH messages, the first rank value, the second rank value, or the sum of the first rank value and the second rank value being less than or equal to the threshold rank value, the first quantity of ports, the second quantity of ports, or the sum of the first quantity of ports and the second quantity of ports being less than or equal to the threshold quantity of ports, or a combination thereof, wherein transmitting the first PUSCH message, the second PUSCH message, or both is based at least in part on selecting the first PUSCH message and the second PUSCH message.

Aspect 16: The method of any of aspects 1 through 15, further comprising: the threshold rank value associated with PUSCH transmissions that overlap in the time domain corresponds to an aggregate threshold rank value the UE is capable of supporting for PUSCH transmissions that overlap in the time domain; and transmitting the first PUSCH message, the second PUSCH message, or both is based at least in part on whether the sum of the first rank value and the second rank value satisfies the threshold rank value.

Aspect 17: The method of any of aspects 1 through 15, further comprising: the threshold rank value associated with PUSCH transmissions that overlap in the time domain comprises a first threshold rank value associated with the set of first PUSCH messages and a second threshold rank value associated with the second PUSCH message; and transmitting the first PUSCH message, the second PUSCH message, or both is based at least in part on whether the first rank value satisfies the first threshold rank value or the second rank value satisfies the second threshold rank value.

Aspect 18: The method of any of aspects 1 through 15, further comprising: the threshold quantity of ports associated with PUSCH transmissions that overlap in the time domain corresponds to an aggregate threshold quantity of ports the UE is capable of supporting for PUSCH transmissions that overlap in the time domain; and transmitting the first PUSCH message, the second PUSCH message, or both is based at least in part on whether the sum of the first quantity of ports and the second quantity of ports satisfies the threshold quantity of ports.

Aspect 19: The method of any of aspect 1, further comprising: the threshold quantity of ports associated with PUSCH transmissions that overlap in the time domain corresponds to a first threshold quantity of ports associated with the set of first PUSCH messages and a second threshold quantity of ports associated with the second PUSCH message; and transmitting the first PUSCH message, the second PUSCH message, or both is based at least in part on whether the first quantity of ports satisfies the first threshold quantity of ports or the second quantity of ports satisfies the second threshold quantity of ports.

Aspect 20: The method of any of aspects 1 through 19, wherein transmitting the first PUSCH message, the second PUSCH message, or both further comprises: transmitting the first PUSCH message and the second PUSCH message based at least in part on: the first rank value, the second rank value, or the sum of the first rank value and the second rank value being less than or equal to the threshold rank value, and the first quantity of ports, the second quantity of ports, or the sum of the first quantity of ports and the second quantity of ports being less than or equal to the threshold quantity of ports.

Aspect 21: A method for wireless communications at a network entity, comprising: transmitting, to a UE, a first control message indicating a set of first PUSCH messages that have a first periodicity, the set of first PUSCH messages including a first PUSCH message associated with a first rank value and a first quantity of ports; transmitting, to the UE, a second control message indicating a second PUSCH message that is associated with a second rank value and a second quantity of ports, wherein the second PUSCH message overlaps at least partially in a time domain with the first PUSCH message; and receiving, from the UE, the first PUSCH message, the second PUSCH message, or both based at least in part on whether: the first rank value, the second rank value, or a sum of the first rank value and the second rank value satisfies a threshold rank value associated with PUSCH transmissions that overlap in the time domain, or the first quantity of ports, the second quantity of ports, or a sum of the first quantity of ports and the second quantity of ports satisfies a threshold quantity of ports associated with PUSCH transmissions that overlap in the time domain.

Aspect 22: The method of aspect 21, wherein receiving the first PUSCH message, the second PUSCH message, or both further comprises: receiving the first PUSCH message; and failing to detect the second PUSCH message based at least in part on: the first rank value, the second rank value, or the sum of the first rank value and the second rank value satisfying the threshold rank value, or the first quantity of ports, the second quantity of ports, or the sum of the first quantity of ports and the second quantity of ports satisfying the threshold quantity of ports.

Aspect 23: The method of aspect 22, wherein receiving the first PUSCH message and failing to detect the second PUSCH message is based at least in part on a CORESET index associated with the second PUSCH message, an SRS resource set associated with the second PUSCH message, or both.

Aspect 24: The method of any of aspect 22, wherein receiving the first PUSCH message and failing to detect the second PUSCH message is based at least in part on a first priority associated with the first PUSCH message satisfying a second priority associated with the second PUSCH message Aspect 25: The method of any of aspect 22, wherein receiving the first PUSCH message and failing to detect the second PUSCH message is based at least in part on a first starting position of the first PUSCH message being prior to a second starting position of the second PUSCH message.

Aspect 26: The method of any of aspects 22 through 25, wherein the second control message indicates a set of second PUSCH messages comprising the second PUSCH message, the set of second PUSCH messages having a second periodicity.

Aspect 27: The method of aspect 26, wherein receiving the first PUSCH message and failing to detect the second PUSCH message is based at least in part on a second CG configuration index associated with the set of second PUSCH messages being greater than a first CG configuration index associated with the set of first PUSCH messages or the second CG configuration index being less than the first CG configuration index.

Aspect 28: The method of any of aspects 26 through 27, wherein receiving the first PUSCH message and failing to detect the second PUSCH message is based at least in part on a second periodicity of the set of second PUSCH messages being greater than the first periodicity of the set of first PUSCH messages or the second periodicity of the set of second PUSCH messages being less than the first periodicity of the set of first PUSCH messages.

Aspect 29: The method of aspect 22, wherein receiving the first PUSCH message and failing to detect the second PUSCH message is based at least in part on a first comparison between a first MCS associated with the first PUSCH message and a second MCS associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

Aspect 30: The method of aspect 22, wherein the threshold rank value associated with PUSCH transmissions that overlap in the time domain comprise a first threshold rank value associated with the set of first PUSCH messages and a second threshold rank value associated with the second PUSCH message; and receiving the first PUSCH message and failing to detect the second PUSCH message is based at least in part on: the first rank value associated with the set of first PUSCH messages being less than or equal to the first threshold rank value, and the second rank value associated with the second PUSCH message being greater than the second threshold rank value.

Aspect 31: The method aspect 21, wherein the threshold quantity of ports associated with PUSCH transmissions that overlap in the time domain comprise a first threshold quantity of ports associated with the set of first PUSCH messages and a second threshold quantity of ports associated with the second PUSCH message; and receiving the first PUSCH message and failing to detect the second PUSCH message is based at least in part on: the first quantity of ports associated with the set of first PUSCH messages being less than or equal to the first threshold quantity of ports, and the second quantity of ports associated with the second PUSCH message being greater than the second threshold quantity of ports.

Aspect 32: The method of aspect 31, wherein the first control message indicates that the set of first PUSCH messages are CG-PUSCH messages transmitting the second control message further comprises transmitting DCI indicating that the second PUSCH message is a DG-PUSCH message; and receiving the first PUSCH message, the second PUSCH message, or both further comprises failing to detect the first PUSCH message and receiving the second PUSCH message based at least in part on: the first rank value, the second rank value, or the sum of the first rank value and the second rank value satisfying the threshold rank value, or the first quantity of ports, the second quantity of ports, or the sum of the first quantity of ports and the second quantity of ports satisfying the threshold quantity of ports.

Aspect 33: The method of any of aspects 21 through 32, wherein failing to detect the first PUSCH message and receiving the second PUSCH message is based at least in part on the first PUSCH message being a CG-PUSCH message and the second PUSCH message being the DG-PUSCH message.

Aspect 34: The method of aspect 21, wherein the first control message indicates a first plurality of PUSCH messages comprising at least the first PUSCH message that overlap at least partially in the time domain; and the second control message indicates a second plurality of PUSCH messages comprising at least the second PUSCH message that overlap at least partially in the time domain.

Aspect 35: The method of any of aspects 21 through 34, further comprising: receiving the first PUSCH message from the first plurality of PUSCH messages and the second PUSCH message from the second plurality of PUSCH messages based at least in part on: the first PUSCH message being associated with a higher priority than remaining PUSCH messages in the first plurality of PUSCH messages, the second PUSCH message being associated with a higher priority than remaining PUSCH messages in the second plurality of PUSCH messages, the first rank value, the second rank value, or the sum of the first rank value and the second rank value being less than or equal to the threshold rank value, the first quantity of ports, the second quantity of ports, or the sum of the first quantity of ports and the second quantity of ports being less than or equal to the threshold quantity of ports, or a combination thereof.

Aspect 36: The method of any of aspects 21 through 35, wherein the threshold rank value associated with PUSCH transmissions that overlap in the time domain corresponds to an aggregate threshold rank value the UE is capable of supporting for PUSCH transmissions that overlap in the time domain; and the threshold rank value associated with PUSCH transmissions that overlap in the time domain corresponds to an aggregate threshold rank value the UE is capable of supporting for PUSCH transmissions that overlap in the time domain; and Aspect 37: The method of any of aspects 21 through 36, wherein the threshold rank value associated with PUSCH transmissions that overlap in the time domain comprises a first threshold rank value associated with the set of first PUSCH messages and a second threshold rank value associated with the second PUSCH message; and receiving the first PUSCH message, the second PUSCH message, or both is based at least in part on whether the first rank value satisfies the first threshold rank value or the second rank value satisfies the second threshold rank value.

Aspect 38: The method of any of aspects 21 through 37, wherein the threshold quantity of ports associated with PUSCH transmissions that overlap in the time domain corresponds to an aggregate threshold quantity of ports the UE is capable of supporting for PUSCH transmissions that overlap in the time domain; and receiving the first PUSCH message, the second PUSCH message, or both is based at least in part on whether the sum of the first quantity of ports and the second quantity of ports satisfies the threshold quantity of ports.

Aspect 39: The method of any of aspects 21 through 38, wherein the threshold quantity of ports associated with PUSCH transmissions that overlap in the time domain corresponds to a first threshold quantity of ports associated with the set of first PUSCH messages and a second threshold quantity of ports associated with the second PUSCH message; and receiving the first PUSCH message, the second PUSCH message, or both is based at least in part on whether the first quantity of ports satisfies the first threshold quantity of ports or the second quantity of ports satisfies the second threshold quantity of ports.

Aspect 40: The method of any of aspects 21 through 39, wherein receiving the first PUSCH message, the second PUSCH message, or both further comprises: receiving the first PUSCH message and the second PUSCH message based at least in part on: the first rank value, the second rank value, or the sum of the first rank value and the second rank value being less than or equal to the threshold rank value, and the first quantity of ports, the second quantity of ports, or the sum of the first quantity of ports and the second quantity of ports being less than or equal to the threshold quantity of ports.

Aspect 41: An apparatus for wireless communications, comprising a processor; memory coupled with the processor; and instructions stored in the memory and executable by the processor to cause the apparatus to perform a method of any of aspects 1 through 20.

Aspect 42: An apparatus for wireless communications, comprising at least one means for performing a method of any of aspects 1 through 20.

Aspect 43: A non-transitory computer-readable medium storing code for wireless communications, the code comprising instructions executable by a processor to perform a method of any of aspects 1 through 20.

Aspect 44: An apparatus for wireless communications at a network entity, comprising a processor; memory coupled with the processor; and instructions stored in the memory and executable by the processor to cause the apparatus to perform a method of any of aspects 21 through 39.

Aspect 45: An apparatus for wireless communications at a network entity, comprising at least one means for performing a method of any of aspects 21 through 39.

Aspect 46: A non-transitory computer-readable medium storing code for wireless communications at a network entity, the code comprising instructions executable by a processor to perform a method of any of aspects 21 through 39.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

69

What is claimed is:

1. A method for wireless communications at a user equipment (UE), comprising:

receiving a first control message indicating a set of first physical uplink shared channel (PUSCH) messages that have a first periodicity, the set of first PUSCH messages including a first PUSCH message associated with a first rank value and a first quantity of ports;

receiving a second control message indicating a second PUSCH message that is associated with a second rank value and a second quantity of ports, wherein the second PUSCH message overlaps at least partially in a time domain with the first PUSCH message;

transmitting the first PUSCH message; and refraining from transmitting the second PUSCH message based at least in part on:

the first rank value, the second rank value, or a sum of the first rank value and the second rank value satisfying a threshold rank value associated with PUSCH transmissions that overlap in the time domain, or the first quantity of ports, the second quantity of ports, or a sum of the first quantity of ports and the second quantity of ports satisfying a threshold quantity of ports associated with PUSCH transmissions that overlap in the time domain, wherein transmitting the first PUSCH message and refraining from transmitting the second PUSCH message is based at least in part on a control resource set index associated with the second PUSCH message, a sounding reference signal resource set associated with the second PUSCH message, or both, and wherein the UE refrains from transmitting PUSCH messages associated with the control resource set index or the sounding reference signal resource set when:

one or more control messages indicate PUSCH messages that overlap in the time domain; and one or more rank values associated with the PUSCH messages that overlap in the time domain satisfy the threshold rank value or one or more quantities of ports associated with the PUSCH messages that overlap in the time domain satisfy the threshold quantity of ports.

2. The method of claim 1, wherein transmitting the first PUSCH message and refraining from transmitting the second PUSCH message is based at least in part on a first priority associated with the first PUSCH message being greater than a second priority associated with the second PUSCH message.

3. The method of claim 1, wherein transmitting the first PUSCH message and refraining from transmitting the second PUSCH message is based at least in part on a first starting position of the first PUSCH message being prior to a second starting position of the second PUSCH message.

4. The method of claim 1, wherein:

the second control message indicates a set of second PUSCH messages comprising the second PUSCH message, the set of second PUSCH messages having a second periodicity; and transmitting the first PUSCH message and refraining from transmitting the second PUSCH message is based at least in part on the UE refraining from transmitting the second PUSCH message from the set of second PUSCH messages when:

the second PUSCH message overlaps in the time domain with another PUSCH message; and one or more rank values associated with PUSCH messages that overlap in the time domain satisfies the threshold rank value or one or more quantities of ports associated with the PUSCH messages that overlap in the time domain satisfies the threshold quantity of ports.

5. The method of claim 4, wherein the UE refrains from transmitting the second PUSCH message from the set of second PUSCH messages based at least in part on a second configured grant configuration index associated with the set of second PUSCH messages being greater than a first configured grant configuration index associated with the set of first PUSCH messages or the second configured grant configuration index being less than the first configured grant configuration index.

6. The method of claim 4, wherein the UE refrains from transmitting PUSCH messages from the set of second PUSCH messages based at least in part on the second periodicity of the set of second PUSCH messages being greater than the first periodicity of the set of first PUSCH messages or the second periodicity of the set of second PUSCH messages being less than the first periodicity of the set of first PUSCH messages.

7. The method of claim 1, wherein transmitting the first PUSCH message and refraining from transmitting the second PUSCH message is based at least in part on:

a first comparison between a first modulation coding scheme associated with the first PUSCH message and a second modulation coding scheme associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

8. The method of claim 1, wherein:

the threshold rank value associated with PUSCH transmissions that overlap in the time domain comprise a first threshold rank value associated with the set of first PUSCH messages and a second threshold rank value associated with the second PUSCH message; and transmitting the first PUSCH message and refraining from transmitting the second PUSCH message is based at least in part on:

the first rank value associated with the set of first PUSCH messages being less than or equal to the first threshold rank value, and the second rank value associated with the second PUSCH message being greater than the second threshold rank value.

9. The method of claim 1, wherein:

the threshold quantity of ports associated with PUSCH transmissions that overlap in the time domain comprise a first threshold quantity of ports associated with the set of first PUSCH messages and a second threshold quantity of ports associated with the second PUSCH message; and transmitting the first PUSCH message and refraining from transmitting the second PUSCH message is based at least in part on:

the first quantity of ports associated with the set of first PUSCH messages being less than or equal to the first threshold quantity of ports, and the second quantity of ports associated with the second PUSCH message being greater than the second threshold quantity of ports.

10. The method of claim 1, wherein:

the first control message indicates a first plurality of PUSCH messages comprising at least the first PUSCH message that overlap at least partially in the time domain; and the second control message indicates a second plurality of PUSCH messages comprising at least the second PUSCH message that overlap at least partially in the time domain.

11. The method of claim 10, further comprising:

selecting the first PUSCH message from the first plurality of PUSCH messages and the second PUSCH message from the second plurality of PUSCH messages based at least in part on:

the first PUSCH message being associated with a higher priority than remaining PUSCH messages in the first plurality of PUSCH messages, the second PUSCH message being associated with a higher priority than remaining PUSCH messages in the second plurality of PUSCH messages, the first rank value, the second rank value, or the sum of the first rank value and the second rank value being less than or equal to the threshold rank value, the first quantity of ports, the second quantity of ports, or the sum of the first quantity of ports and the second quantity of ports being less than or equal to the threshold quantity of ports, or a combination thereof, wherein transmitting the first PUSCH message and refraining from transmitting the second PUSCH message is based at least in part on selecting the first PUSCH message and the second PUSCH message.

12. A method for wireless communications at a network entity, comprising:

transmitting, to a user equipment (UE), a first control message indicating a set of first physical uplink shared channel (PUSCH) messages that have a first periodicity, the set of first PUSCH messages including a first PUSCH message associated with a first rank value and a first quantity of ports;

transmitting, to the UE, a second control message indicating a second PUSCH message that is associated with a second rank value and a second quantity of ports, wherein the second PUSCH message overlaps at least partially in a time domain with the first PUSCH message;

receiving, from the UE, the first PUSCH message; and failing to detect the second PUSCH message based at least in part on:

the first rank value, the second rank value, or a sum of the first rank value and the second rank value satisfying a threshold rank value associated with PUSCH transmissions that overlap in the time domain, or the first quantity of ports, the second quantity of ports, or a sum of the first quantity of ports and the second quantity of ports satisfying a threshold quantity of ports associated with PUSCH transmissions that overlap in the time domain, wherein receiving the first PUSCH message and failing to detect the second PUSCH message is based at least in part on a control resource set index associated with the second PUSCH message, a sounding reference signal resource set associated with the second PUSCH message, or both.

13. The method of claim 12, wherein receiving the first PUSCH message and failing to detect the second PUSCH message is based at least in part on a first priority associated with the first PUSCH message being greater than a second priority associated with the second PUSCH message.

14. The method of claim 12, wherein transmitting the first PUSCH message and failing to detect the second PUSCH message is based at least in part on a first starting position of the first PUSCH message being prior to a second starting position of the second PUSCH message.

15. The method of claim 12, wherein the second control message indicates a set of second PUSCH messages comprising the second PUSCH message, the set of second PUSCH messages having a second periodicity.

16. The method of claim 15, wherein receiving the first PUSCH message and failing to detect the second PUSCH message is based at least in part on a second configured grant configuration index associated with the set of second PUSCH messages being greater than a first configured grant configuration index associated with the set of first PUSCH messages or the second configured grant configuration index being less than the first configured grant configuration index.

17. The method of claim 15, wherein receiving the first PUSCH message and failing to detect the second PUSCH message is based at least in part on the second periodicity of the set of second PUSCH messages being greater than the first periodicity of the set of first PUSCH messages or the second periodicity of the set of second PUSCH messages being less than the first periodicity of the set of first PUSCH messages.

18. The method of claim 12, wherein receiving the first PUSCH message and failing to detect the second PUSCH message is based at least in part on:

a first comparison between a first modulation coding scheme associated with the first PUSCH message and a second modulation coding scheme associated with the second PUSCH message, a second comparison between a first transport block size associated with the first PUSCH message and a second transport block size associated with the second PUSCH message, or a third comparison between the first rank value associated with the first PUSCH message and the second rank value associated with the second PUSCH message.

19. The method of claim 12, wherein:

the threshold rank value associated with PUSCH transmissions that overlap in the time domain comprise a first threshold rank value associated with the set of first PUSCH messages and a second threshold rank value associated with the second PUSCH message; and receiving the first PUSCH message and failing to detect the second PUSCH message is based at least in part on:

the first rank value associated with the set of first PUSCH messages being less than or equal to the first threshold rank value, and the second rank value associated with the second PUSCH message being greater than the second threshold rank value.

20. The method of claim 12, wherein:

the threshold quantity of ports associated with PUSCH transmissions that overlap in the time domain comprise a first threshold quantity of ports associated with the set of first PUSCH messages and a second threshold quantity of ports associated with the second PUSCH message; and receiving the first PUSCH message and failing to detect the second PUSCH message is based at least in part on:

the first quantity of ports associated with the set of first PUSCH messages being less than or equal to the first threshold quantity of ports, and

US 12,580,867 B2

73 the second quantity of ports associated with the second
PUSCH message being greater than the second
threshold quantity of ports.
21. A user equipment (UE) for wireless communications,
comprising:
one or more memories storing processor-executable code;
and
one or more processors coupled with the one or more
memories and individually or collectively operable to
execute the code to cause the UE to:
receive a first control message indicating a set of first
physical uplink shared channel (PUSCH) messages
that have a first periodicity, the set of first PUSCH
messages including a first PUSCH message associ-
ated with a first rank value and a first quantity of
ports;
receive a second control message indicating a second
PUSCH message that is associated with a second
rank value and a second quantity of ports, wherein
the second PUSCH message overlaps at least par-
tially in a time domain with the first PUSCH mes-
sage;
transmit the first PUSCH message; and
refrain from transmitting the second PUSCH message
based at least in part on:
the first rank value, the second rank value, or a sum
of the first rank value and the second rank value
satisfying a threshold rank value associated with
PUSCH transmissions that overlap in the time
domain, or
the first quantity of ports, the second quantity of
ports, or a sum of the first quantity of ports and the
second quantity of ports satisfying a threshold
quantity of ports associated with PUSCH trans-
missions that overlap in the time domain,
wherein transmitting the first PUSCH message and
refraining from transmitting the second PUSCH
message is based at least in part on a control resource
set index associated with the second PUSCH mes-
sage, a sounding reference signal resource set asso-
ciated with the second PUSCH message, or both, and
wherein the UE refrains from transmitting PUSCH
messages associated with the control resource set
index or the sounding reference signal resource set
when:
one or more control messages indicate PUSCH mes-
sages that overlap in the time domain; and

74 one or more rank values associated with the PUSCH
messages that overlap in the time domain satisfy
the threshold rank value or one or more quantities
of ports associated with the PUSCH messages that
overlap in the time domain satisfy the threshold
quantity of ports.
22. A network entity for wireless communications, com-
prising:
one or more memories storing processor-executable code;
and
one or more processors coupled with the one or more
memories and individually or collectively operable to
execute the code to cause the network entity to:
transmit, to a user equipment (UE), a first control
message indicating a set of first physical uplink
shared channel (PUSCH) messages that have a first
periodicity, the set of first PUSCH messages includ-
ing a first PUSCH message associated with a first
rank value and a first quantity of ports;
transmit, to the UE, a second control message indicat-
ing a second PUSCH message that is associated with
a second rank value and a second quantity of ports,
wherein the second PUSCH message overlaps at
least partially in a time domain with the first PUSCH
message;
receive, from the UE, the first PUSCH message; and
fail to detect the second PUSCH message based at least
in part on:
the first rank value, the second rank value, or a sum
of the first rank value and the second rank value
satisfying a threshold rank value associated with
PUSCH transmissions that overlap in the time
domain, or
the first quantity of ports, the second quantity of
ports, or a sum of the first quantity of ports and the
second quantity of ports satisfying a threshold
quantity of ports associated with PUSCH trans-
missions that overlap in the time domain,
wherein receiving the first PUSCH message and failing to
detect the second PUSCH message is based at least in
part on a control resource set index associated with the
second PUSCH message, a sounding reference signal
resource set associated with the second PUSCH mes-
sage, or both.

* * * * *